United States Patent Office 3,317,512
Patented May 2, 1967

3,317,512
5',5'-DINUCLEOSIDE PHOSPHATES
William J. Wechter, Kalamazoo, Mich., assignor to The Upjohn Company, Kalamazoo, Mich., a corporation of Delaware
No Drawing. Filed June 1, 1965, Ser. No. 460,554
14 Claims. (Cl. 260—211.5)

The present application is concerned with novel compounds and, more particularly, 5',5'-dinucleoside phosphates containing 1-β-D-arabinofuranosylcytosine as one nucleoside moiety, intermediates thereof, the pharmaceutically acceptable salts thereof, and a process for the preparation thereof.

The novel products and the generic process can be illustratively represented by the following sequence of formulae:

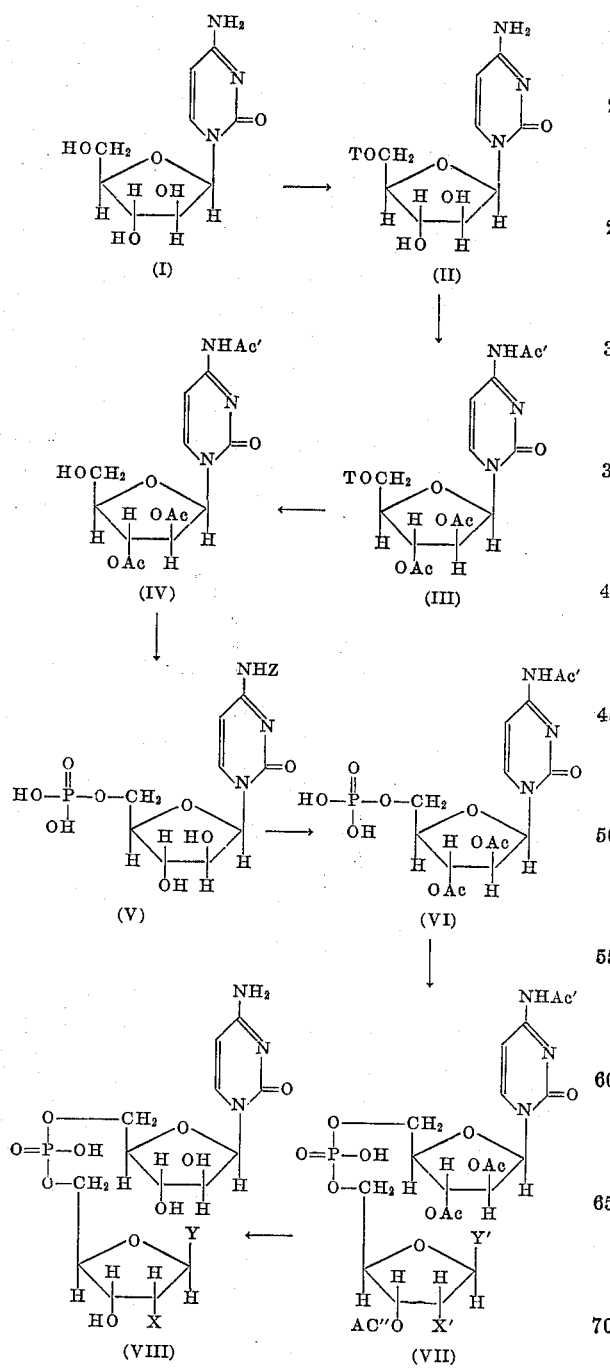

wherein Ac, Ac' and Ac" are selected from the group consisting of acyl radicals of hydrocrbon carboxylic acids containing from 2 to 12 carbon atoms, inclusive, wherein T is selected from the group consisting of triphenylmethyl, (p - methoxyphenyl)diphenylmethyl and bis(p-methoxyphenyl)phenylmethyl, wherein X is selected from the group consisting of hydrogen and hydroxy, wherein X' is selected from the group consisting of hydrogen and Ac"O wherein Ac" is defined as hereinabove, wherein Y is selected from the group consisting of cytosin-1-yl, uracil-1-yl, -thymin-1-yl (alternatively, 5-methyluracil-1 yl), adenin - 9 - yl (alternatively, 6 - aminopurin-9-yl), guanin-9-yl (alternatively, 2-amino-6-hydroxypurin-9-yl), 7-deazaadenin-9-yl (alternatively, 6-amino-7-deazapurin-9-yl), 6-mercaptopurin-9-yl, uracil-3-yl, 5-fluorouracil-1-yl, 5-chlorouracil-1-yl, 5-bromouracil-1-yl, 5-iodouracil-1-yl-5-trifluoromethyluracil-1-yl, hypoxanthin-9-yl (alternatively, 6-hydroxypurin-9-yl), xanthin-9-yl (alternatively, 2,6 - dihydroxypurin - 9 - yl, and 5-methoxylcytosin-1-yl, wherein Y is defined as Y in which amino groups are protected by an acyl group defined as hereinabove, and wherein Z is selected from the group consisting of hydrogen and acyl defined as hereinabove.

Examples of acyl radicals of hydrocarbon carboxylic acids as herein used include acetyl, propionyl, butyryl, valeryl, isovaleryl, hexanoyl, heptanoyl, octanoyl, nonanoyl, decanoyl, undecanoyl, lauroyl, benzoyl, phenylacetyl, phenylpropionyl, anisoyl, p-toluoyl, β-cyclopentylpropionyl, and the like.

The heterocyclic radicals Y are obtained when a hydrogen atom is removed from the parent compound at the position indicated by the number prior to the ending "-yl." The radicals Y have therefore the following formulae:

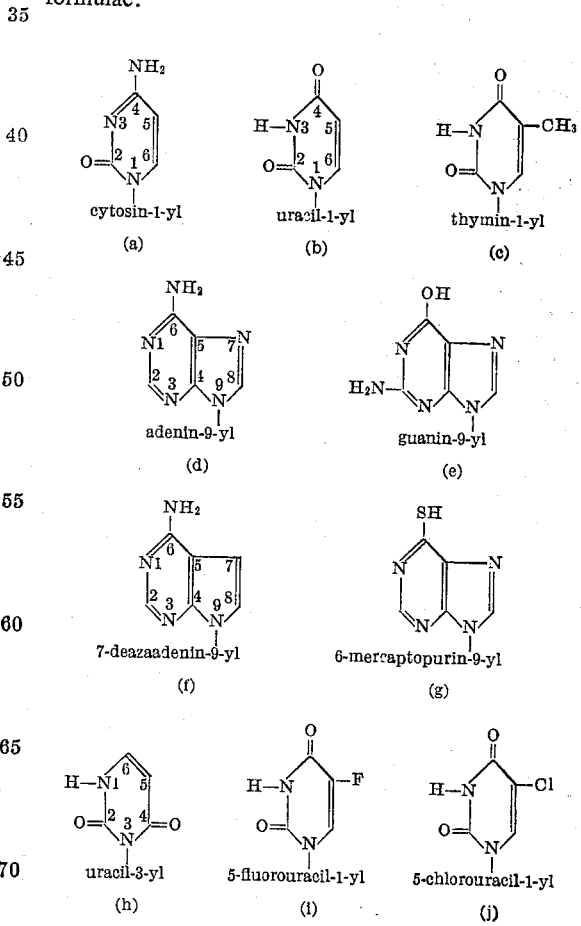

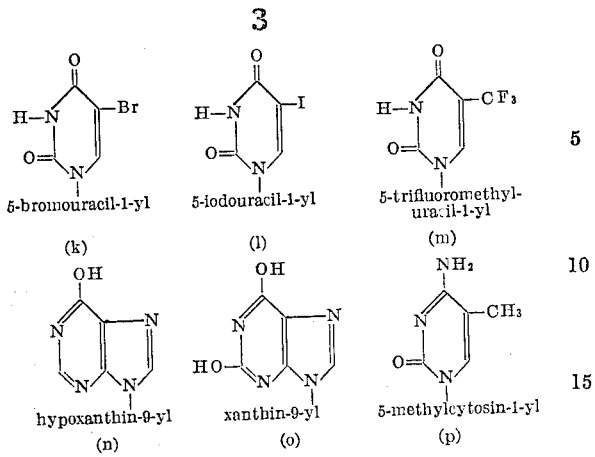

5-bromouracil-1-yl (k)   5-iodouracil-1-yl (l)   5-trifluoromethyl-uracil-1-yl (m)

hypoxanthin-9-yl (n)   xanthin-9-yl (o)   5-methylcytosin-1-yl (p)

The above uracil radicals (b) and (h) and substituted-uracil radicals (c), (i), (j), (k), (l) and (m) are written in the keto form, rather than in the tautomeric enol form. Likewise, other of the above radicals can be written in tautomeric form. For example, the cytosine and substituted-cytosine radicals (a) and (p) are written in the amino form, but they can also be written in the tautomeric imino form. In chemical compounds, e.g., the compounds of this invention, such forms may frequently be present in an equilibrium mixture.

Besides the end products of Formula VIII, the present invention has as another object the novel intermediates such as represented by Formulae II, III, IV, VI and VII.

The process of the present invention is essentially designed to protect those groups in the nitrogenous heterocyclic moiety as well as in the sugar moiety of the molecule which can react with phosphoric acid or the phosphorylating agent and leave at the same time the desired hydroxy group at position 5', that is, the only primary alcoholic group in the sugar moiety, open to react with the phosphorylating agent. While the process can therefore slightly vary, depending on the selected nucleoside and protecting agent, the basic process can be described as shown in the before-disclosed sequence of formulae, in the following manner:

1-β-D-arabinofuranosylcytosine (I) as free base or as salt of a mineral acid such as hydrochloric acid is etherified at the 5'-position, for example, with chlorotriphenylmethane, to give the corresponding 1-(5'-O-triphenylmethyl - β - D - arabinofuranosyl) - cytosine (II). Compound II is thereupon reacted with an acylating agent selected from the group consisting of acid anhydrides and acid halides of hydrocarbon carboxylic acids containing from 2 to 12 carbon atoms, inclusive, such as acetic anhydride, propionic anhydride, benzoyl chloride, and the like, to produce acylation on the hydroxy groups 2' and 3' and on the amino group of the cytosine moiety. The resulting 5'-etherified-N⁴,2',3'-triacylated product (III) without further purification is subjected to selective cleavage of the 5'-ether group to give the corresponding N⁴ - acyl - 1 - (2',3' - di - O - acyl - β - D - arabinofuranosyl)-cytosine (IV). Compound IV is thereupon treated with a selected phosphorylating agent, for example, 2-cyanoethyl phosphate, in the presence of a selected condensing agent such as dicyclohexylcarbodiimide, and subsequently with an alkali base such as dilute aqueous lithium hydroxide, to give a 1-β-D-arabinofuranosylcytosine 5'-phosphate (V). In this step the acyl groups in positions 2' and 3' are removed, while the acyl group on N⁴ is removed only when vigorous conditions are used in the hydrolysis, e.g., heating to reflux the base-containing solution. Compound V is thereupon reacylated to give the corresponding N⁴-acyl-1-(2',3'-di-O-acyl-β-D-arabinofuranosyl)cytosine 5'-phosphate of Formula VI. To obtain an acylated 5',5'-dinucleoside phosphate of Formula VII, compound VI is thereupon condensed with a β-D-ribofuranoside or β-D-deoxyribofuranoside which is obtained when a ribofuranoside or deoxyribofuranoside of the Formula IX below:

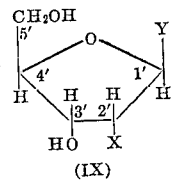

is protected in such a manner that only the 5'-hydroxy group is free to react with the compound of Formula VI. In Formula IX the parameters X and Y are defined as hereinabove, and the protection of the 2' and 3' hydroxy groups of a ribofuranoside (or the 3' hydroxy group of adeoxyribofuranoside) and of any amino groups possibly present in Y, can be obtained by acylation in the stepwise manner shown in the prior process I→II→III→IV. If X is a hydroxy group, the 2' and 3' hydroxy groups can alternatively be protected by formation of an acetal, for example, of a simple ketone such as acetone, methyl ethyl ketone, diethyl ketone, dipropyl ketone, cyclohexanone, and the like.

The β-D-ribofuranoside and β-D-deoxyribofuranoside reactants are, therefore, selected from the group consisting of compounds represented by the formulae:

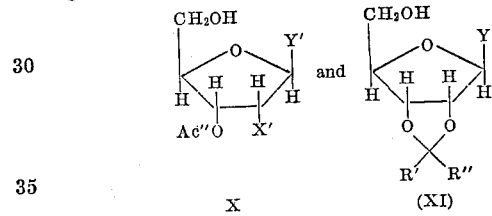

wherein Ac", X' and Y' have the same values as hereinbefore, and wherein R' and R" are lower alkyl radicals having from 1 to 3 carbon atoms, inclusive.

When a Formula XI reactant is used, instead of product VII, a product having the Formula XII is obtained:

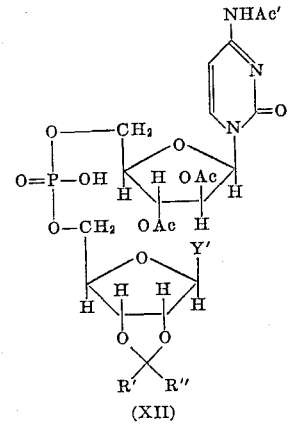

wherein Ac, Ac', R', R" and Y' are defined as hereinabove, which by hydrolysis provides compound VIII. Likewise, hydrolysis of compound VII provides compound VIII.

Alternatively, compounds of Formulae VII and XII and thereby end product VIII can be produced by condensing an N⁴-acyl-1-(2',3'-di-O-acyl-β-D-arabinofuranosyl)cytosine (IV) with a 5'-phosphate of compounds X or XI. Such 5'-phosphates are prepared by treating compounds of Formulae X and XI with a phosphorylating agent, condensing agent and an alkali-metal base, as shown in the conversion of compound IV to V.

The novel oligonucleotides of Formula VIII exhibit significant cytotoxic activity in vitro, particularly against KB tumor cells, and against viruses, particularly the different types of Herpes, Coe, and vaccinia viruses. For this reason, the products can be employed for cleansing glassware and instruments, used in the growing of tissue cultures in virus and tumor research, washing excised tumor tissue intended for transplant into animals to inhibit the growth of any KB tumor cells that might otherwise seed surrounding tissues, or be transported to other parts of the animal body. The anti-viral activity can also be used to prepare cultures of microorganisms, free of viral phages, e.g., phage-free antibiotic-producing Stereptomyces cultures. Compounds of Formula VIII cured Herpes keratitis in the eye of virus-infected domestic animals.

The starting material, 1-β-D-arabinofuranosylcytosine, and the compounds indicated by Formula IX are generally known in the art. See Michaelson, The Chemistry of Nucleosides and Nucleotides, Academic Press, London and New York, 1963. 7-deazaadenin-9-yl riboside, also known as sparsomycin A, or tubercidin, is disclosed below together with the preparation of its 2′,3′-O-isopropylidene derivative.

In carrying out the process of the present invention, 1-β-D-arabinofuranosylcytosine (I) as hydrochloride, hydrobromide or other salt, or as free base, is treated with an etherifying agent in a basic organic solvent. As etherifying agent, chlorotriphenylmethane, chloro(p-methoxyphenyl)diphenylmethane, chloro-bis(p-methoxyphenyl)phenylmethane and the bromo analogues of these three compounds are generally employed. As an organic base, pyridine, picolines, lutidines, trialkylamines and the like can be used, with pyridine preferred. The reaction can be carried out at a temperature between 0 and 60° C. and is preferably carried out at room temperature, between 20 and 30° C. The reaction time at room temperature requires a period of between 6 hours and 10 days. In the preferred embodiment of this invention, the 1-β-D-arabinofuranosylcytosine is stirred in pyridine solution with chlorotriphenylmethane or bromotriphenylmethane for a period of 6 hours to 10 days. Thereafter, the product is isolated by conventional means, such as pouring the mixture into water and separating the product after it has crystallized. The product can be purified by conventional means, such as recrystallization, for example, from acetone.

The acylation of the thus-obtained product, 1-(5′-O-triphenylmethyl-β-D-arabinofuranosyl)cytosine, is carried out with an acylating agent selected from acyl chlorides, acyl bromides, and acid anhydrides of hydrocarbon carboxylic acids having from 2 to 12 carbon atoms, inclusive. Illustrative acyl chlorides and acyl bromides include acetyl chloride, acetyl bromide, benzoyl chloride, anisoyl chloride, para-ethylbenzoyl chloride, para-methylbenzoyl bromide, β-cyclopentylpropionyl chloride, lauroyl chloride, decanoyl chloride, octanoyl bromide, and the like. Illustrative acid anhydrides include acetic anhydride, propionic anhydride, butyric anhydride, phenylacetic anhydride, phenylpropionic anhydride, hexanoic anhydride, and the like. In the preferred embodiment of this invention, the acylation reaction is carried out in dry pyridine at room temperature, between 20 and 30° C. under continuous stirring for a period of 1 to 48 hours. After this period the material is recovered by standard procedures such as pouring the pyridine solution into water, decanting the water, and purifying the remaining material by conventional means such as chromatography, extraction, recrystallization, or a combination of these methods, and the like. The thus-obtained N⁴-acyl-1-(5′-O-triphenylmethyl-2′,3′-di-O-acyl-β-D-arabinofuranosyl)cytosine is then subjected to an ether cleavage reaction, for example, with acetic acid or with acetic acid containing a hydrogen halide, e.g., hydrogen chloride, hydrogen bromide or hydrogen iodide, to give the corresponding N⁴-acyl-1-(2′,3′-di-O-acyl-β-D-arabinofuranosyl)cytosine.

The same method (i.e., etherification, acylation and ether cleavage) is also used to protect groups capable of reacting with the phosphorylating agent in ribofuranosides and deoxyribofuranosides of Formula IX. An alternative method to protect the hydroxy groups at the 2′ and 3′ positions of the ribofuranoside of Formula IX is to react the vicinal hydroxy groups of compounds IX with a ketone, particularly acetone, diethyl ketone, ethyl methyl ketone, dipropyl ketone and the like, in the presence of a catalyst such as sulfuric acid to give the corresponding acetal compound. This method is shown in some detail for sparsomycin A.

The phosphorylation of the protected N⁴-acyl-1-(2′,3′-di-O-acyl-β-D-arabinofuranosyl)cytosine is carried out by the method of G. M. Tener, J. Am. Chem. Soc., 83, 159 (1959). Solvents used in this procedure are anhydrous, non-hydroxylic solvents in which the phosphorylating agent, a phosphate ester, is also soluble. Such solvents include pyridine, picolines, lutidines, and the like. Neutral solvents such as dimethyl sulfoxide, tetrahydrofuran, N,N-dimethylacetamide or dioxane can be used, providing that for each mole of phosphorylating agent one equivalent of base is added. Representative bases for this reaction include pyridine, picolines, lutidines and trialkylamines.

Phosphate esters, which are readily cleaved by an alkali base, are employed and particularly useful for this reaction are 2-substituted-ethyl dihydrogen phosphates of the formula:

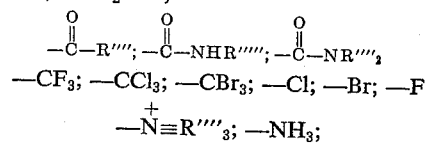

wherein R‴ is selected from the group consisting of hydrogen and lower alkyl; wherein Z is a strongly electronegative substituent selected from the group consisting of —C≡N; —SO₂R″″;

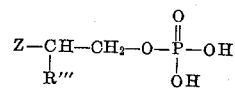

—CF₃; —CCl₃; —CBr₃; —Cl; —Br; —F

—N≡R″″₃⁺; —NH₃⁺;

IO₂; —COOR″″; —NO₂ and the like; wherein R″″ is selected from the group consisting of lower alkyl and aryl; and wherein R‴″ is selected from the group consisting of hydrogen, lower alkyl and aryl. The preferred 2-substituted-ethyl dihydrogen phosphate is 2-cyano-ethyl dihydrogen phosphate.

Instead of a 2-substituted-ethyl dihydrogen phosphate, other dihydrogen phosphate esters which are easily cleaved by a base may be used, for example, o- and p-substituted-phenyl dihydrogen phosphates, such as o- and p-carboxyphenyl dihydrogen phosphate, o- and p-carbamoylphenyl dihydrogen phosphate, and o- and p-cyanophenyl dihydrogen phosphate.

In the solution containing the 2-substituted-ethyl dihydrogen phosphate or o- or p-substituted-phenyl dihydrogen phosphate, the before-mentioned acyl-protected 1-β-D-arabinofuranosylcytosine is dissolved, if necessary under application of heating between 30 and 50° C. After all the N⁴-acyl-1-(2′,3′-di-O-acyl-β-D-arabinofuranosyl)cytosine is dissolved, a condensing agent is added such as an alkyl-, cycloalkyl- or aryl-substituted carbodiimide, preferably dicyclohexylcarbodiimide. Other compounds unrelated to carbodiimides which can be used as condensing agents are p-toluenesulfonyl chloride, methoxyacetylene, ketene-imines, trichloroacetonitrile, substituted cyanamides, α-substituted acetonitriles, alkyl- and arylisocyanates, carboxylic acid chlorides, aralkyl chlorocarbonates and the like.

The preferred temperatures for this reaction are those temperatures around and slightly above room temperature, that is, temperatures between 20 and 40° C.; however, the reaction can be carried out at lower temperatures, such as 5° C., and up to temperatures of about 75° C. without undue side reactions. At a temperature between 20 and 40° C. and at reasonable concentration, the time required for the reaction to be completed is about 6 to 24 hours. However, reaction times between 1 and 60 hours can be used; the reaction time should be significantly prolonged at greater dilution.

The concentration of the reactants is not critical. Equimolecular amounts of $N^4$-acyl-1-(2'-3'-di-O-acyl-$\beta$-D-arabinofuranosyl)cytosine, the 2-substituted-ethyl dihydrogen phosphate and the condensing agent give approximately quantitative conversion, if sufficient time is allowed for the reaction to be completed. In order to shorten the time of reaction, a 3 to 4 times molar excess of the 2-substituted-ethyl dihydrogen phosphate over $N^4$-acyl - 1 - (2',3'-di-O-acyl-$\beta$-D-arabinofuranosyl)cytosine is preferred. After the reaction is terminated, a small amount of water is added to inactivate the excess of phosphorylating agent and the excess of condensing agent. The solution is then filtered to remove insoluble material such as the disubstituted ureas resulting from the reaction of carbodiimides with water, and the filtrate is used for the next step, the hydrolytic reaction.

The solution obtained from the prior step is reacted with an alkali hydroxide solution to produce the desired hydrolysis. In the preferred embodiment of the invention, the solution containing the $N^4$-acyl-1-(2',3'-di-O-acyl - $\beta$ - D-arabinofuranosyl)cytosin-5'-yl 2-cyanoethyl phosphate is first concentrated until a small volume is obtained, concentration preferably achieved under vacuum. When the volume is low enough so that the cooled material becomes a viscous residue, a base, e.g., aqueous lithium, sodium or potassium hydroxide of a 0.4 to 2 normality, is added until the pH of the solution rises to between 12 and 13. Concentrated ammonium hydroxide can also be used. This reaction is carried out at temperatures between 0° C. and the boiling point of the aqueous solution, for a period of between about 10 minutes to 24 hours. After termination of the reaction, the mixture is cooled and filtered. From the filtrate the product V is recovered by conventional methods such as extraction, evaporation, precipitation in the form of insoluble phosphate salts, absorption and desorption on resins, recrystallization and the like.

Depending on the reaction conditions, a 1-$\beta$-D-arabinofuranosylcytosine 5'-phosphate is obtained with the acyl group on $N^4$ remaining or eliminated. At low temperatures, e.g., 0-20° C., and short reaction periods, e.g., 10-40 minutes, the acyl group on $N^4$ will remain. If the alkaline solution containing the organic cyanophosphate is kept at higher temperatures, e.g., between 75-100° C., the acyl group on $N^4$ is removed.

The thus-obtatined 1-$\beta$-D-arabinofuranosylcytosine 5'-phosphate or its $N^4$-acyl derivative is reacylated in the same manner as Compound 11, preferably in anhydrous pyridine with an acylating agent selected from the group consisting of anhydrides and halides of hydrocarbon carboxylic acids containing from 2 to 12 carbon atoms, inclusive, to give the $N^4$-acyl-1-(2',3'-di-O-acyl-$\beta$-D-arabinofuranosyl)cytosine 5'-phosphate (VI).

The thus-obtained product VI is thereupon condensed with a compound selected from the group consisting of ribofuranosides and deoxyribofuranosides of Formulae X and XI. In the preferred embodiment of this invention, the condensation is carried out with an equimolecular amount of $N^4$-acyl-1-(2',3'-di-O-acyl-$\beta$-D-arabinofuranosyl)cytosine 5'-phosphate and the selected ribofuranoside or deoxyribofuranoside of Formula X or XI in anhydrous pyridine in the presence of a carbodiimide, e.g., dicyclohexylcarbodiimide, at room temperature, 20-30° C. Instead of pyridine as solvent, alkyl-substituted pyridines such as picolines, lutidines, etc., as well as dimethylformamide, diethylformamide, and the like can be used. The reaction can be carried out at temperatures between 0 and 60° C., but room temperature, between 20 and 30° C., is preferred. At room temperatures, the reaction period is between 1 and 10 days, usually between 4 and 8 days. At the termination of the reaction, water is added and the thus-produced disubstituted urea compound is removed from the reaction mixture by filtration. The product, a dinucleoside monohydrogen phosphate (VII) or (XII), is isolated by conventional methods, illustratively by extracting impurities with a water-immiscible solvent, e.g., petroleum ether, benzene, Skellysolve hexanes, carbon tetrachloride, methylene chloride, ether and the like, and lyophilizing the remaining aqueous mixture. Extraction and lyophilization is often repeated to rid the aqueous mixture of all by-products. After isolation, the product VII or XII may be further purified by conventional methods, e.g., by recrystallization, chromatography, electrophoresis, and the like.

The thus-obtained ester product VII is then treated with anhydrous ammoniacal methanol or other non-aqueous base to hydrolytically remove the acyl groups and to give the dinucleoside phosphate VIII in which one of the nucleoside moieties is 1-$\beta$-D-arabinofuranosylcytosin-5'-yl. The ester product XII is subjected first to alkaline hydrolysis and then to acid hydrolysis in order to obtain the dinucleoside phosphate VIII.

Product VIII is isolated and purified by methods similar to those used for product VII or XII, at times with the additional use of electrophoresis.

The following examples are illustrative of the products and process of the present invention but are not to be construed as limiting.

*Example 1.*—*1-(5'-O-triphenylmethyl-$\beta$-D-arabinofuranosyl)cytosine*

To a solution of 10 g. of 1-$\beta$-D-arabinofuranosylcytosine hydrochloride in 200 ml. of pyridine was added 12 g. of chlorotriphenylmethane. The reaction mixture was thereupon stirred at room temperature (23–26° C.) for 1 week. The reaction mixture was then poured with stirring into 3 l. of ice water whereupon 1-(5'-O-triphenylmethyl-$\beta$-D-arabinofuranosyl)cytosine separated as an oil. The oil crystallized on standing with water overnight, and the crystals were recovered by filtration, then broken up, washed thoroughly with water and air dried until constant weight was obtained. The thus-obtained solid was triturated with 200 ml. of boiling heptane and the mixture filtered, collecting the crystals on a sintered glass funnel. The crystals were again washed with two 150-ml. portions of boiling heptane and, after having been dried, were transferred into 1 l. of boiling acetone containing 1 g. of activated charcoal (Darco G–60). The hot suspension was filtered to remove the charcoal and the filtrate was distilled on a steam bath to a volume of about 75 ml. which was allowed to cool to room temperature, thereby giving a crystalline product. The crystalline product was collected on a sintered glass funnel and washed with one 25-ml. portion of ice-cold acetone. The product was then dried, giving 13 g. of 1-(5'-O-triphenylmethyl-$\beta$-D-arabinofuranosyl)cytosine of melting point 227.5–228° C. with decomposition.

In the same manner, 1-[5'-O-(p-methoxyphenyl)diphenylmethyl-$\beta$-D-arabinofuranosyl]cytosine or 1-[5'-O-bis(p - methoxyphenyl)-phenylmethyl-$\beta$-D-arabinofuranosyl]cytosine can be obtained by reacting 1-$\beta$-D-arabinofuranosylcytosine or its hydrochloride in pyridine solution with chloro(p-methoxylphenyl)diphenylmethane or chloro-bis(p-methoxyphenyl)phenylmethane at a temperature between 0 and 60° C. under continuous stirring.

Similarly to Example 1, instead of chlorotriphenylmethane, bromotriphenylmethane can be used to give the same final product, 1-(5'-O-triphenylmethyl-$\beta$-D-arabinofuranosyl)cytosine.

*Example 2.*—*1-(5'-O-triphenylmethyl-$\beta$-D-ribofuranosyl)uracil*

In the manner given in Example 1, 1-$\beta$-D-ribofuranosyluracil was reacted with chlorotriphenylmethane in pyridine to give 1-(5'-O-triphenylmethyl-$\beta$-D-ribofuranosyl)uracil.

Example 3.—1-(5'-O-triphenylmethyl-β-D-ribofuranosyl) thymine

In the manner given in Example 1, 1-β-D-ribofuranosyl-thymine was reacted with chlorotriphenylmethane in pyridine to give 1-(5'-O-triphenylmethyl-β-D-ribofuranosyl) thymine.

Example 4.—9-(5'-O-triphenylmethyl-β-D-ribofuranosyl) adenine

In the manner given in Example 1, 9-β-D-ribofuranosyl-adenine was reacted with chlorotriphenylmethane in pyridine to give 9-(5'-O-triphenylmethyl-β-D-ribofuranosyl) adenine.

Example 5.—9-(5'-O-triphenylmethyl-β-D-ribofuranosyl)-7-deazaadenine

In the manner given in Example 1, 9-β-D-ribofuranoyl-7-deazaadenine was reacted with chlorotriphenylmethane in pyridine to give 9-(5'-O-triphenylmethyl-β-ribofuranosyl)-7-deazaadenine.

Example 6.—9-(5'-O-triphenylmethyl-β-D-ribofuranosyl)-6-mercaptopurine

In the manner given in Example 1, 9-β-D-ribofuranosyl-6-mercaptopurine was reacted with chlorotriphenylmethane in pyridine to given 9-(5'-O-triphenylmethyl-β-D-ribofuranosyl)-6-mercaptopurine.

Example 7.—3-(5'-O-triphenylmethyl-β-D-ribofuranosyl) uracil

In the manner given in Example 1, 3-β-D-ribofuranosyl-uracil was reacted with chlorotriphenylmethane in pyridine to give 3-(5'-O-triphenylmethyl-β-D-ribofuranosyl) uracil.

Example 8.—1-(5'-O-triphenylmethyl-β-D-ribofuranosyl)-5-florouracil

In the manner given in Example 1, 1-β-D-ribofuranosyl-5-fluorouracil was reacted with chlorotriphenylmethane in pyridine to give 1-(5'-O-triphenylmethyl-β-D-ribofuranosyl)-5-fluorouracil.

Example 9.—1-(5'-O-triphenylmethyl-β-D-ribofuranosyl)-5-trifluoromethyluracil In the manner given in Example 1, 1-β-D-ribofuranosyl-5-trifluoromethyluracil was reacted with chlorotriphenylmethane in pyridine to given 1-(5'-O-triphenylmethyl-β-D-ribofuranosyl)-5-trifluoromethyluracil.

Example 10.—1-(5'-O-triphenylmethyl-β-D-ribofuranosyl)-5-methylcytosine

In the manner given in Example 1, 1-β-D-ribofuranosyl-5-methylcytosine was reacted with chlorotriphenylmethane in pyridine to give 1-(5'-O-triphenylmethyl-β-D-ribofuranosyl)-5-methylcytosine.

Example 11.—1-(5'-O-triphenylmethyl-β-D-ribofuranosyl) cytosine

In the manner given in Example 1, 1-β-D-ribofuranosylcytosine was reacted with chlorotriphenylmethane in pyridine to give 1-(5'-O-triphenylmethyl-β-D-ribofuranosyl) cytosine.

Example 12.—1-(5'-O-triphenylmethyl-β-D-deoxyribofuranosyl) uracil

In the manner given in Example 1, 1-β-D-deoxyribofuranosyluracil was reacted with chlorotriphenylmethane to give 1-(5'-O-triphenylmethyl-β-D-deoxyribofuranosyl) uracil.

Example 13.—1-(5'-O-triphenylmethyl-β-D-deoxyribofuranosyl) cytosine

In the manner given in Example 1, 1-β-D-deoxyribofuranosylcytosine was reacted with chlorotriphenylmethane to give 1-(5'-O-triphenylmethyl-β-D-deoxyribofuranosyl) cytosine.

Example 14.—9-(5'-O-triphenylmethyl-β-D-deoxyribofuranosyl) adenine

In the manner given in Example 1, 9-β-D-deoxyribofuranosyl-adenine was reacted with chlorotriphenylmethane to give 9-(5'-O-triphenylmethyl-β-D-deoxyribofuranosyl) adenine.

Example 15.—9-(5'-O-triphenylmethyl-β-D-deoxyribofuranosyl) guanine

In the manner given in Example 1, 9-β-D-deoxyribofuranosyl-quanine was reacted with chlorotriphenylmethane to give 9-(5'-O-triphenylmethyl-β-D-deoxyribofuranosyl) guanine.

Example 16.—9-(5'-O-triphenylmethyl-β-D-deoxyribofuranosyl)-6-mercaptopurine

In the manner given in Example 1, 9-β-D-deoxyribofuranosyl-6-mercaptopurine was reacted with chlorotriphenylmethane to give 9-(5'-O-triphenylmethyl-β-D-deoxyribofuranosyl)-6-mercaptopurine.

Example 17.—1-(5'-O-triphenylmethyl-β-D-deoxyribofuranosyl)-5-fluorouracil

In the manner given in Example 1, 1-β-D-deoxyribofuranosyl-5-fluorouracil was reacted with chlorotriphenylmethane to give 1-(5'-O-triphenylmethyl-β-D-deoxyribofuranosyl)-5-fluorouracil.

Example 18.—1-(5'-O-triphenylmethyl-β-D-deoxyribofuranosyl)-5-chlorouracil

In the manner given in Example 1, 1-β-D-deoxyribofuranosyl-5-chlorouracil was reacted with chlorotriphenylmethane to give 1-(5'-O-triphenylmethyl-β-D-deoxyribofuranosyl)-5-chlorouracil.

Example 19.—1-(5'-O-triphenylmethyl-β-D-deoxyribofuranosyl-5-bromouracil

In the manner given in Example 1, 1-β-D-deoxyribofuranosyl-5-bromouracil was reacted with chlorotriphenylmethane to give 1-(5'-O-triphenylmethyl-β-D-deoxyribofuranosyl)-5-bromouracil.

Example 20.—1-(5'-O-triphenylmethyl-β-D-deoxyribofuranosyl)-5-iodouracil

In the manner given in Example 1, 1-β-D-deoxyribofuranosyl-5-iodouracil was reacted with chlorotriphenylmethane to give 1-(5'-O-triphenylmethyl-β-D-deoxyribofuranosyl)-5-iodouracil.

Example 21.—9-(5'-O-triphenylmethyl-β-D-deoxyribofuranosyl)-hypoxanthine

In the manner given in Example 1, 9-β-D-deoxyribofuranosyl-hypoxanthine was reacted with chlorotriphenylmethane to give 9-(5'-O-triphenylmethyl-β-D-deoxyribofuranosyl) hypoxanthine.

Example 22.—9-(5'-O-triphenylmethyl-β-D-deoxyribofuranosyl) xanthine

In the manner given in Example 1, 9-β-D-deoxyribofuranosyl-xanthine was reacted with chlorotriphenylmethane to give 9-(5'-O-triphenylmethyl-β-D-deoxyribofuranosyl) xanthine.

In the same manner as given in Example 1, other 5'-O-triphenylmethyl, 5'-O-(p-methoxyphenyl)diphenylmethyl or 5'-O-bis(p-methoxyphenyl)phenylmethyl ribofuranosides and deoxyribofuranosides having the Formula XIII:

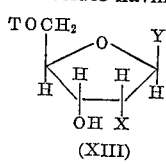

(XIII)

wherein X, Y and T have the same significance as hereinbefore, can be prepared by reacting a ribofuranoside or deoxyribofuranoside of Formula IX with chlorotriphenylmethane (trityl chloride) or bromotriphenylmethane, chloro- or bromo-(p-methoxyphenyl)diphenylmethane or bis(p - methoxyphenyl)phenylmethane. Representative compounds of Formula XIII thus produced include 9-(5'-O - triphenylmethyl-β-D-ribofuranosyl)guanine, 1-(5'-O-triphenylmethyl-β-D-ribofuranosyl)-5-chlorouracil, 1-(5'-O - triphenylmethyl-β-D-ribofuranosyl)-5-bromouracil, 1-(5'-O-triphenylmethyl-β-D-ribofuranosyl)-5-iodouracil, 9-(5' - O-triphenylmethyl-β-D-ribofuranosyl)hypoxanthine, 9 - (5'-O-triphenylmethyl-β-D-ribofuranosyl)xanthine, 1-(5' - O-triphenylmethyl-β-D-deoxyribofuranosyl)thymine, 9 - ( 5'-O-triphenylmethyl-β-D-deoxyribofuranosyl)-7-deazaadenine, 3-(5'-O-triphenylmethyl-β-D-deoxyribofuranosyl)uracil, 1-(5'-O-triphenylmethyl-β-D-deoxyribofuranosyl)-5-trifluoromethyluracil, 1-(5'-O-triphenylmethyl-β-D-deoxyribofuranosyl)-5-methylcytosine, 1-[5'-O-(p-methoxyphenyl)diphenylmethyl - β-D-deoxyribofuranosyl]uracil, 1-[5'-O-bis(p-methoxyphenyl)phenylmethyl-β-D-deoxyribofuranosyl]uracil, 1-[5'-O-bis(p-methoxyphenyl)phenylmethyl-β-D-deoxyribofuranosyl]cytosine, and the like.

*Example 23.—N⁴-benzoyl-1-(2',3'-di-O-benzoyl-β-D-arabinofuranosyl)cytosine*

A mixture of 6.2 g. of 1-(5'-O-triphenylmethyl-β-D-arabinofuranosyl)cytosine, 40 ml. of dry pyridine, and 6 ml. of benzoyl chloride was stirred at room temperature (24–26° C.) for 20 hours. The thus-obtained reaction mixture was then poured into 500 ml. of cold water and stirred at room temperature for 3 hours. The aqueous portion was then decanted and the residual gummy material was washed twice with water by decantation. The gum and solids were dissolved in 150 ml. of methylene chloride and this solution was extracted twice with 50-ml. portions of water and once with 50 ml. of a saturated aqueous sodium chloride solution. The methylene chloride solution was then dried by passing it through 10 g. of anhydrous sodium sulfate, supported on a sintered glass funnel. The drying agent was then washed with 20 ml. of methylene chloride and the washing combined with the filtrate. The methylene chloride solution was thereupon evaporated at 40° C. in vacuo. The thus-obtained residue was dissolved in 50 ml. of chloroform and treated with stirring with 6.7 ml. of a solution of hydrogen bromide in acetic acid (30% hydrogen bromide). After 3 minutes, the reaction mixture was distilled to a volume of about 10 ml. at 40° C. in vacuo, to give a concentrate. This concentrate was diluted with 10 ml. of chloroform and added to a chromatographic column made up with 100 g. of silica gel (column volume, 180 ml.). The silica gel employed was Brinkman silicic acid for chromatography, employing hydrocarbon-stabilized, alcohol-free chloroform. The column was thereupon eluted with 3 column volumes (540 ml.) of ethanol-stabilized chloroform at a flow rate of about 3.5 ml. per minute. The effluent of this procedure was discarded. The column was thereupon eluted with 1.2 l. of ethanol-stabilized chloroform to which 3% by volume of methanol had been added (at a flow rate of 3.5 ml. per minute). The effluent from this operation was collected in 20-ml. fractions. Each fraction was examined for the presence of triphenylcarbinol or bis(triphenylmethyl) ether by placing a drop of each fraction on a sheet of chromatographic paper (Whatman No. 40) and examining the spot for ultraviolet absorption followed by spraying the paper with 50% aqueous sulfuric acid. Based on the result of this chromatographic determination, fractions 25–43 were combined, washed with 200 ml. of water containing 0.5 ml. of pyridine, dried with anhydrous sodium sulfate, and evaporated in vacuo to give a residue. This residue was recrystallized from ethyl acetate and Skellysolve B hexanes with refrigeration to 4° C. Three crops of crystals were collected which were all homogeneous as determined by thin layer chromatography using silica gel, 10% methanol and 90% benzene. The total yield in three crops was 1.45 g., 0.94 g. and 0.74 g., a total of 3.13 g. (44%) of N⁴-benzoyl-1-(2',3'-di-O-benzoyl-β-D-arabinofuranosyl)cytosine of melting point 177.5 to 178° C.

*Example 24.—N⁴-acetyl-1-(2',3'-di-O-acetyl-5'-O-triphenylmethyl-β-D-arabinofuranosyl)cytosine*

A suspension of 750 mg. of 1-(5'-O-triphenylmethyl-β-D-arabinofuranosyl)cytosine in 9 ml. of pyridine was treated with 3 ml. of acetic anhydride with stirring until a uniform solution was obtained. Stirring was then continued for 2 hrs., whereupon the solution became a crystalline mass. This material was transferred into 90 ml. of water whereupon a white crystalline material was isolated by filtration, washed thoroughly with water, and dried, giving 950 mg. of solid of melting point 248–249.5° C. This material was recrystallized from ethanol, giving 800 mg. of colorless crystals of N⁴-acetyl-1-(2',3'-di - O-acetyl-5'-O-triphenylmethyl-β-D-arabinofuranosyl)cytosine of melting point 251–252° C.

*Analysis.*—Calcd. for $C_{34}H_{33}N_3O_8$: C, 66.76; H, 5.44; N, 6.87. Found: C, 67.04; H, 5.47; N, 7.00.

*Example 25.—N⁴-(β-cyclopentylpropionyl)-1-[2',3'-di-O-(β - cyclopentylpropionyl)-β-D-arabinofuranosyl]cytosine*

In the manner given in Example 23, 1-(5'-O-triphenylmethyl-β-D-arabinofuranosyl)cytosine was reacted with β-cyclopentylpropionyl chloride in pyridine and subsequently treated with hydrogen bromide, dissolved in acetic acid, to give N⁴-(β-cyclopentylpropionyl)-1-[2',3'-di-O - (β - cyclopentylpropionyl) - β-D-arabinofuranosyl]cytosine.

*Example 26.—N⁴-lauroyl-1-(2',3'-di-O-lauroyl-β-D-arabinofuranosyl)cytosine*

In the manner given in Example 23, 1-(5'-O-triphenylmethyl-β-D-arabinofuranosyl)cytosine was reacted with lauroyl chloride in pyridine and subsequently treated with hydrogen bromide, dissolved in acetic acid, to give N⁴-lauroyl - 1-(2',3'-di-O-lauroyl-β-D-arabinofuranosyl)cytosine.

*Example 27.—N⁴-decanoyl-1-(2',3'-di-O-decanoyl-β-D-arabinofuranosyl)cytosine*

In the manner given in Example 23, 1-(5'-O-triphenylmethyl-β-D-arabinofuranosyl)cytosine was reacted with decanoyl chloride in pyridine and subsequently treated with hydrogen bromide, dissolved in acetic acid, to give N⁴ - decanoyl - 1-(2',3'-di-O-decanoyl-β-D-arabinofuranosyl)cytosine.

*Example 28.—N⁴-propionyl-1-(2',3'-di-O-propionyl-5'-O-triphenylmethyl-β-D-arabinofuranosyl)cytosine*

In the manner given in Example 24, 1-(5'-O-triphenylmethyl-β-D-arabinofuranosyl)cytosine was reacted with propionic anhydride in pyridine to give N⁴-propionyl-1-(2',3' - di-O-propionyl-5'-O-triphenylmethyl-β-D-arabinofuranosyl)cytosine.

*Example 29.—N⁴-butyryl-1-(2',3'-di-O-butyryl-5'-O-triphenylmethyl-β-D-arabinofuranosyl)cytosine*

In the manner given in Example 24, 1-(5'-O-triphenylmethyl-β-D-arabinofuranosyl)cytosine was reacted with butyric anhydride in pyridine to give N⁴-butyryl-1-(2',3'-di - O - butyryl-5'-O-triphenylmethyl-β-D-arabinofuranosyl)cytosine.

*Example 30.—N⁴-phenylacetyl-1 - (2',3'-di-O-phenylacetyl-5'-O-triphenylmethyl-β-D-arabinofuranosyl)cytosine*

In the manner given in Example 24, 1-(5'-O-triphenylmethyl-β-D-arabinofuranosyl)cytosine was reacted with phenylacetic anhydride in pyridine to give N⁴-phenylacetyl-1 - (2',3' - di - O - phenylacetyl-5'-O-triphenylmethyl-β-D-arabinofuranosyl)cytosine.

Example 31.—$N^4$-hexanoyl-1-(2′,3′-di-O-hexanoyl-5′-O-triphenylmethyl-β-D-arabinofuranosyl)cytosine In the manner given in Example 24, 1-(5′-O-triphenylmethyl-β-D-arabinofuranosyl)cytosine was reacted with hexanoic anhydride in pyridine to give $N^4$-hexanoyl-1-(2′,3′-di-O-hexanoyl-5′-O-triphenylmethyl-β-D-arabinofuranosyl)cytosine.

Example 32.—$N^4$-phenylpropionyl-1-(2′,3′-di-O-phenylpropionyl-5′-O-triphenylmethyl-β-D-arabinofuranosyl)-cytosine In the manner given in Example 24, 1-(5′-O-triphenylmethyl-β-D-arabinofuranosyl)cytosine was reacted with phenylpropionic anhydride in pyridine to give $N^4$-phenylpropionyl-1-(2′,3′-di-O-phenylpropionyl--5′-O-triphenylmethyl-β-D-arabinofuranosyl)cytosine.

In the manner given in Example 24, other $N^4$-acyl-1-(2′,3′-di-O-acyl-5′-O-triphenylmethyl and (p-methoxyphenyl)diphenylmethyl and bis(p-methoxyphenyl)phenylmethyl-β-D-arabinofuranosyl)cytosines (III) can be prepared by reacting 1-(5′-O-triphenylmethyl-β-D-arabinofuranosyl)cytosine or the p-methoxy substituted analogues with an acid anhydride of a hydrocarbon carboxylic acid containing from 2 to 12 carbon atoms, inclusive. Representative cytosines of Formula III thus prepared include:

$N^4$-valeryl-1-(2′,3′-di-O-valeryl-5′-O-triphenylmethyl-β-D-arabinofuranosyl)cytosine,
$N^4$-heptanoyl-1-(2′,3′-di-O-heptanoyl-5′-O-triphenylmethyl-β-D-arabinofuranosyl)cytosine,
$N^4$-octanoyl-1-(2′,3′-di-O-octanoyl-5′-O-triphenylmethyl-β-D-arabinofuranosyl)cytosine,
$N^4$-acetyl-1-[2′,3′-di-O-acetyl-5′-O-(p-methoxyphenyl)diphenylmethyl-β-D-arabinofuranosyl]cytosine,
$N^4$-acetyl-1-[2′,3′-di-O-acetyl-5′-O-bis(p-methoxyphenyl)phenylmethyl-β-D-arabinofuranosyl]cytosine,
$N^4$-phenylpropionyl-1-[2′,3′-di-O-phenylpropionyl-5′-O-(p-methoxyphenyl)diphenylmethyl-β-D-arabinofuranosyl]cytosine, and the like.

Example 33.—1-(2′,3′-di-O-benzoyl-β-D-ribofuranosyl)uracil

In the manner given in Example 23, 1-(5′-O-triphenylmethyl-β-D-ribofuranosyl)uracil was reacted with benzoyl chloride and the resulting product was then reacted with a solution of hydrogen bromide in acetic acid to give 1-(2′,3′-di-O-benzoyl-β-D-ribofuranosyl)uracil.

Example 34.—1-(2′,3′-di-O-benzoyl-β-D-ribofuranosyl)thymine

In the manner given in Example 23, 1-(5′-O-triphenylmethyl-β-D-ribofuranosyl)thymine was reacted with benzoyl chloride and the resulting product was then reacted with a solution of hydrogen bromide in acetic acid to give 1-(2′,3′-di-O-benzoyl-β-D-ribofuranosyl)thymine.

Example 35.—1-(2′,3′-di-O-benzyl-β-D-ribofuranosyl)-5-fluorouracil

In the manner given in Example 23, 1-(5′-O-triphenylmethyl-β-D-ribofuranosyl)-5-fluorouracil was reacted with benzoyl chloride and the resulting product was then reacted with a solution of hydrogen bromide in acetic acid to give 1-(2′,3-di-O-benzoyl-β-D-ribofuranosyl)-5-fluorouracil.

Example 36.—$N^6$-benzoyl-9-(2′,3′-di-O-benzoyl-β-D-ribofuranosyl)-7-deazaadenine In the manner given in Example 23, 9-(5′-O-triphenylmethyl-β-D-ribofuranosyl)-7-deazaadenine was reacted with benzoyl chloride and the resulting product was then reacted with a solution of hydrogen bromide in acetic acid to give $N^6$-benzoyl-9-(2′,3′-di-O-benzoyl-β-D-ribofuranosyl)-7-deazaadenine.

Example 37.—9-(2′,3′-di-O-benzoyl-β-D-ribofuransoyl)-6-mercaptopurine

In a manner given in Example 23, 9-(5′-O-triphenylmethyl-β-D-ribofuranosyl)-6-mercaptopurine was reacted with benzoyl chloride and the resulting product was then reacted with a solution of hydrogen bromide in acetic acid to give 9-(2′,3′-di-O-benzoyl-β-D-ribofuranosyl)-6-mercaptopurine.

Example 38.—1-(3′-O-benzoyl-β-D-deoxyribofuranosyl)uracil

In the manner given in Example 23, 1-(5′-O-triphenylmethyl-β-D-deoxyribofuranosyl)uracil was reacted with benzoyl chloride and the resulting product was then reacted with a solution of hydrogen bromide in acetic acid to give 1-(3′-O-benzoyl-β-D-deoxyribofuranosyl)uracil.

Example 39.—$N^4$-benzoyl-1-(3′-O-benzoyl-β-D-deoxyribofuranosyl)cystosine

In the manner given in Example 23, 1-(5′-O-triphenylmethyl-β-D-deoxyribofuranosyl)cytosine was reacted with benzoyl chloride and the resulting product was then reacted with a solution of hydrogen bromide in acetic acid to give $N^4$-benzoyl-1-(3′-O-benzoyl-β-D-deoxyribofuranosyl)cytosine.

Example 40.—1-(3′-O-benzoyl-β-D-deoxyribofuranosyl)-5-fluorouracil

In the manner given in Example 23, 1-(5′-O-triphenylmethyl-β-D-deoxyribofuranosyl)-5-fluorouracil was reacted with benzoyl chloride and the resulting product was then reacted with a solution of hydrogen bromide in acetic acid to give 1-(3′-O-benzoyl-β-D-deoxyribofuranosyl)-5-fluorouracil.

Example 41.—$N^6$-benzoyl-9-(3′-O-benzoyl-β-D-deoxyribofuranosyl)-7-deazaadenine In the manner given in Example 23, 9-(5′-O-triphenylmethyl-β-D-deoxyribofuranosyl)-7-deazaadenine was reacted with benzoyl chloride and the resulting product was then reacted with a solution of hydrogen bromide in acetic acid to give $N^6$-benzoyl-9-(3′-benzoyl-β-D-deoxyribofuranosyl)-7-deazaadenine.

Example 42.—9-(3′-O-benzoyl-β-D-deoxyribofuranosyl)-6-mercaptopurine

In the manner given in Example 23, 9-(5′-O-triphenylmethyl-β-D-deoxyribofuranosyl)-6-mercaptopurine was reacted with benzoyl chloride and the resulting product was then reacted with a solution of hydrogen bromide in acetic acid to give 9-(3′-O-benzoyl-β-D-deoxyribofuranosyl)-6-mercaptopurine.

Example 43.—1-(2′,3′-di-O-acetyl-5′-O-triphenylmethyl-β-D-ribofuranosyl)uracil In the manner given in Example 24, 1-(5′-O-triphenylmethyl-β-D-ribofuranosyl)uracil was reacted with acetic anhydride to give 1-(2′,3′-di-O-acetyl-5′-O-triphenylmethyl-β-D-ribofuranosyl)uracil.

Example 44.—1-(2′,3′-di-O-acetyl-5′-O-triphenylmethyl-β-D-ribofuranosyl)5-fluorouracil In the manner given in Example 24, 1-(5′-O-triphenylmethyl-β-D-ribofuranosyl)-5-fluorouracil was reacted with acetic anhydride to give 1-(2′,3-di-O-acetyl-5′-O-triphenylmethyl-β-D-ribofuranosyl)-5-fluorouracil.

Example 45.—$N^6$-acetyl-9-(2′,3′-di-O-acetyl-5′-O-triphenylmethyl)-β-ribofuranosyl)-7-deazaadenine In the manner given in Example 24, 9-(5′-O-triphenylmethyl-β-D-ribofuranosyl)-7-deazaadenine was reacted with acetic anhydride to give $N^6$-acetyl-9-(2′,3′-di-O-acetyl-5′-O-triphenylmethyl-β-D-ribofuranosyl)-7-deazaadenine.

Example 46.—9-(2',3'-di-O-acetyl-5'-O-triphenylmethyl-β-D-ribofuranosyl)-6-mercaptopurine In the manner given in Example 24, 9-(5'-O-triphenylmethyl-β-D-ribofuranosyl)-6-mercaptopurine was reacted with acetic anhydride to give 9-(2',3'-di-O-acetyl-5'-O-triphenylmethyl-β-D-ribofuranosyl)-6-mercaptopurine.

Example 47.—1-(3'-O-propionyl-5'-triphenylmethyl-β-D-deoxyribofuranosyl)uracil In the manner given in Example 24, 1-(5'-O-triphenylmethyl-β-D-deoxyribofuranosyl)uracil was reacted with propionic anhydride to give 1-(3'-O-propionyl-5'-O-triphenylmethyl-β-D-deoxyribofuranosyl)uracil.

Example 48.—1-(3'-O-propionyl-5'-O-triphenylmethyl-β-D-deoxyribofuranosyl)-5-fluorouracil In the manner given in Example 24, 1-(5'-O-triphenylmethyl-β-D-deoxyribofuranosyl)-5-fluorouracil was reacted with propionic anhydride to give 1-(3'-O-propionyl-5'-O-triphenylmethyl - β - D - deoxyribofuranosyl) - 5 - fluorouracil.

Example 49.—9-(3'-O-propionyl-5'-O-triphenylmethyl-β-D-deoxyribofuranosyl)-6-mercaptopurine In the manner given in Example 24, 9-(5'-O-triphenylmethyl-β-D-deoxyribofuranosyl) - 6 - mercaptopurine was reacted with propionic anhydride to give 9-(3'-O-propionyl-5'-O-triphenylmethyl-β-D-deoxyribofuranosyl) - 6 - mercaptopurine.

Example 50.—$N^4$-acetyl-1-(2',3'-di-O-acetyl-β-D-arabinofuranosyl)-cytosine and 1-(2',3'-di-O-acetyl - β - arabinofuranosyl)cytosine A suspension of 10 ml. of 80% aqueous acetic acid and 1.3 g. of $N^4$-acetyl-1-(2',3'-di-O-acetyl-5'-O-triphenylmethyl-β-D-arabinofuranosyl)cytosine was heated to reflux for 10 minutes. The suspension was then refrigerated, filtered free of triphenylcarbinol, and evaporated in vacuo at a temperature between 30–40° C. The product was taken up in 20 ml. of methanol and poured onto a column containing a volume of 200 ml. of silica gel slurried with benzene. The column was then eluted with thirty 20-ml. fractions consisting of methanol (25%), benzene (75%). Fractions 5–11 were combined and recrystallized from acetone-Skellysolve B hexanes to give 240 mg. of material melting at 171–172.5° C. This product was recrystallized from the same mixture of solvents to give $N^4$-acetyl - 1 - (2',3'-di-O-acetyl-β-D-arabinofuranosyl)cytosine of melting point 174.5 to 175.5° C. and the following analysis:

Analysis.—Calcd. for $C_{15}H_{19}N_3O_8$: C, 48.78; H, 5.19; N, 11.38. Found: C, 48.79; H, 4.81; N, 11.66.

Fractions 26 to 29 contained a small amount of 1-(2',3'-di-O-acetyl-β-D-arabinofuranosyl)cytosine.

Example 51.—$N^4$-anisoyl-1-(2',3'-di-O-benzoyl-β-D-arabinofuranosyl)cytosine (A) $N^4$-anisoyl-1-β-D-arabinofuranosylcytosine.—5 g. of 1-β-D-arabinofuranosylcytosine and 25 ml. of anisoyl chloride were dissolved 100 ml. of pyridine and the solution stirred at about 25° C. for 6 hours. To this mixture was added 400 ml. of 1.5 N hydrochloric acid and the thus-obtained solution was allowed to stand overnight at room temperature between 22–24° C. The solids were then filtered, washed and ground thoroughly with water and air-dried. They were thereupon suspended in a mixture consisting of 375 ml. of water and 250 ml. of ethanol which was heated to 70° C. on a steam bath. The crude suspension was then chilled to 4° C. and the pH adjusted to 8 by adding 1 N sodium hydroxide solution. The insoluble solids were immediately recovered by filtration, were then washed with water and air-dried, and washed again with 300 ml. of ether, filtered and air-dried, to give 16.6 g. of crude $N^4$-anisoyl-1-β-D-arabinofuranosylcytosine.

This crude product was taken up with 195 ml. of pyridine and 65 ml. of water and chilled to ice temperature. The solution was then treated, with vigorous stirring, with 350 ml. of 1.5 N sodium hydroxide for one-half hour. The reaction was then terminated by the addition of 350 ml. of Dowex 50X8 (50–100 mesh) pyridinium resin followed by stirring for 20 minutes (pH 7.0). The solution was filtered free of insoluble material and the resulting residue was washed with water. The combined filtrates were taken to dryness in vacuo at 50° C. and the residue stirred with three 200-ml. portions of ether and filtered. The solid was then suspended in 300 ml. of boiling water and filtered. This process was repeated three times. The combined filtrates were evaporated to a small volume under reduced pressure, giving 2.0 g. of product, of melting point 197–200° C. (decomposition) after recrystallization from water. This crude material was recrystallized four times from water, and once from ethanol, to give pure $N^4$-anisoyl-1-β-D-arabinofuranosylcytosine of melting point 200.5 to 201.5° C. with decomposition.

Analysis.—Calcd. for $C_{17}H_{19}N_3O_7$: C, 54.11; H, 5.08; N, 11.14. Found: C, 54.38; H, 4.82; N, 11.31.

In the same manner as shown in Example 51A, other $N^4$-acyl-1-β-D-arabinofuranosylcytosines are prepared by heating 1-β-D-arabinofuranosylcytosine with an acid chloride of a hydrocarbon carboxylic acid, as defined prior, and selectively hydrolyzing at low temperature with a base the triacyl derivative of 1-β-D-arabinofuranosylcytosine to obtain the $N^4$-acyl-1-β-D-arabinofuranosylcytosine. Representative compounds thus obtained include $N^4$-benzoyl-, $N^4$-phenylacetyl-, $N^4$-phenylpropionyl-, $N^4$-lauroyl-, $N^4$-acetyl-, $N^4$-propionyl-, $N^4$-butyryl-, $N^4$-hexanoyl-, $N^4$-octanoyl-, and $N^4$-decanoyl-1-β-D-arabinofuranosylcytosine.

(B) $N^4$-anisoyl-1-[5' - O-(p - methoxyphenyl)diphenylmethyl - β - D-arabinofuranosyl]cytosine.—A solution of 4.8 g. of $N^4$-anisoyl-1-β-D-arabinofuranosylcytosine in 50 ml. of pyridine was treated with chloro-(p-methoxyphenyl)diphenylmethane. After 9 hours, 10 ml. of methanol was added and the pyridine solution poured into 600 ml. of water with stirring; a gum began to form. When all the gummy material had coagulated, the solution was decanted, the gum was washed several times with water by decantation and then dissolved in methylene chloride. The methylene chloride solution was twice washed with water and once with saturated sodium chloride solution. The solution was then dried over anhydrous sodium sulfate and evaporated to dryness at 30° C. in vacuo, to give a residue. This residue was dissolved in benzene and then absorbed on a column of silica gel (5.8 x 48 cm.) slurried with benzene and the column was then eluted with twenty 100-ml. fractions of 2% methanol, 98% benzene, and then with forty 100-ml. fractions of 5% methanol, 95% benzene. Fractions 49–60 were combined and triturated with ether, giving a crystalline solid which was collected and washed with ether, providing 4.21 g. of crude $N^4$-anisoyl-1-[5'-O-(p-methoxyphenyl)diphenylmethyl-β - D - arabinofuranosyl] cytosine.

In the same manner given in Example 51B, other $N^4$-acyl-1 - [5' - O - (p-methoxyphenyl)diphenylmethyl-β-D-arabinofuranosyl]cytosines can be prepared by using as starting material $N^4$-acyl-1-β-D-arabinofuranosylcytosines in which the acyl group is of ahydro-carbon carboxylic acid containing from 2 to 12 carbon atoms, inclusive. In this manner $N^4$-benzoyl (or phenylacetyl, phenylpropionyl, lauroyl, acetyl, propionyl, butyryl, hexanoyl, octanoyl, decanoyl)-1 - [5' -O - (p-methoxyphenyl)diphenylmethyl-β-D-arabinofuranosyl]cytosines are obtained.

(C) $N^4$-anisoyl-1-(2',3'-di-O-benzoyl-β-D-arabinofuranosyl)cytosine.—4 g. of $N^4$-anisoyl-1-[5'-O-(p-methoxyphenyl)diphenylmethyl-β-D-arabinofuranosyl]cytosine in 20 ml. of dry pyridine was treated with 3 ml. of benzoyl chloride. The sealed reaction mixture was allowed to stand for 18 hours at room temperature and was thereupon poured into ice water, stirred for 3 hours at about 25° C., whereby a gummy solid precipitated. This crude product was extracted with two 50-ml. portions of methylene chloride, the extracts were combined, washed five times with water, one time with saturated aqueous sodium chloride solution, and thereupon dried over anhydrous sodium sulfate and evaporated to dryness in vacuo. The residue was codistilled with toluene at reduced pressure to eliminate residual pyridine and the thus-obtained residue was taken up in 50 ml. of dioxane and treated with 80% aqueous acetic acid. To this solution was added enough hydrochloric acid to produce a 0.03 N solution. The mixture was then allowed to stand for a period of 5 hours. The solvents were removed in vacuo at 40° C. and the residue was treated with 100 ml. of a 1:1 chloroform-ethanol mixture which was then evaporated. The thus-obtained residue was taken up in chloroform and absorbed on a column of silica gel (2.8 cm. diameter, 40 cm. high, having a 250 ml. column volume) slurried with chloroform. The column was then eluted with four 250-ml. fractions of chloroform containing 0.75% ethanol, followed by six 250-ml. fractions of chloroform containing 3% methanol. Fractions 5–8 were combined and absorbed on a silica gel column (2.8 cm. x 50 cm.). This column was then eluted with 4 column volumes of chloroform, followed by 2 l. of 3% methanol in chloroform solution, the eluates being collected in fractions of 20 ml. each at a column rate of 5 ml. per minute. Fractions 46–54 contained 220 mg. of the desired material which when recrystallized from ethyl acetate-Skellysolve B hexanes had a melting point of 172–173° C. This material was pure $N^4$-anisoyl-1-(2',3'-di-O-benzoyl-$\beta$-D-arabinofuranosyl)cytosine.

Analysis.—Calcd. for $C_{31}H_{27}N_3O_9$: C, 63.58; H, 4.65; N, 7.18. Found: C, 63.62; H. 5.12; N, 7.23.

In Example 51 and the subsequent examples various ion exchange resins (Dow Company) are utilized which can be described as follows:

Dowex 50X8: Dowex 50X8 is a strongly acidic cation exchange resin composed of nuclear sulfonic acid exchange groups attached to a styrene polymer lattice cross linked with approximately 8% divinylbenzene.

Dowex AG 50X8: Dowex AG 50X8 is a specially purified and sized form of this Dow Company resin supplied by Bio-Rad Laboratories of Richmond, California.

Dowex 50 WX8: Dowex 50 WX8 is a specially purified form of Dowex 50X8 in which the resin has a white (W) color rather than the yellow brown color of Dowex 50X8.

Dowex 1X8: Dowex 1X8 is a strongly basic anion exchange resin composed of quaternary ammonium exchange groups attached to a polymer lattice as described above.

Dowex AG 1X8 Dowex AG 1X8 is a specially purified and sized form of this Dow Company resin supplied by Bio-Rad Laboratories of Richmond, California.

In the manner given in Example 51C, other $N^4$-acyl-1-(2',3'-di-O-acyl-$\beta$-D-arabinofuranosyl)cytosines are prepared by acylating an $N^4$-acyl-1-[5'-O-(p-methoxyphenyl) diphenylmethyl-$\beta$-D-arabinofuranosyl]cytosine and cleaving the ether to obtain the corresponding primary alcohol. Representative compounds thus obtained include $N^4$-benzoyl - 1-(2',3'-di-O-acetyl-$\beta$-D-arabinofuranosyl)cytosine, $N^4$ - phenylacetyl - 1 - (2',3'-di-O-benzoyl-$\beta$-D-arabinofuranosyl)cytosine, $N^4$-phenylacetyl-1-(2',3'-di-O-propionyl-$\beta$-D-arabinofuranosyl)cytosine, $N_4$ - phenylpropionyl-1-(2',3'-di-O-decanoyl-$\beta$-D - arabinofuranosyl)cytosine, $N^4$-lauroyl - 1-(2',3'-di-O-valeryl-$\beta$-D-arabinofuranosyl)cytosine, $N^4$-acetyl-1-(2',3'-di-O-benzoyl-$\beta$-D-arabinofuranosyl)cytosine, and the like.

*Example 52.—$N^4$-butyryl-1-(2',3'-di-O-butyryl-$\beta$-D-arabinofuranosyl)cytosine*

In the manner given in Example 50, $N^4$-butyryl-1(2',3'-di-O-butyryl-5'-O-triphenylmethyl-$\beta$-D-arabinofuranosyl) cytosine is heated with aqueous acetic acid to give $N^4$-butyryl - 1-(2',3'-di-O-butyryl-$\beta$-D-arabinofuranosyl)cytosine.

*Example 53.—$N^4$-phenylacetyl-1-(2',3'-di-O-phenylacetyl-$\beta$-D-arabinofuranosyl)cytosine*

In the manner given in Example 50, $N^4$-phenylacetyl-1-(2',3'-di-O-phenylacetyl-5'-O-triphenylmethyl-$\beta$-D - arabinofuranosyl)cytosine is heated with aqueous acetic acid to give $N^4$-phenylacetyl-1-(2',3'-di-O-phenylacetyl-$\beta$-D-arabinofuranosyl)cytosine.

*Example 54.—$N^4$-hexanoyl-1-(2',3'-di-O-hexanoyl-$\beta$-D-arabinofuranosyl)cytosine*

In the manner given in Example 50, $N^4$-hexanoyl-1-(2',3'-di-O-hexanoyl-5'-O-triphenylmethyl-$\beta$-D-arabinofuranosyl)cytosine is heated with aqueous acetic acid to give $N^4$ - hexanoyl-1-(2',3'-di-O-hexanoyl-$\beta$-D-arabinofuranosyl)cytosine.

*Example 55.—$N^4$-phenylpropionyl-1-(2',3'-di-O-phenylpropionyl-$\beta$-D-arabinofuranosyl)cytosine*

In the manner given in Example 50, $N^4$-phenylpropionyl-1-(2',3'-di-O-phenylpropionyl-5'-O - triphenylmethyl-$\beta$-D-arabinofuranosyl)cytosine is heated with aqueous acetic acid to give $N^4$-phenylpropionyl-1-(2',3'-di-O-phenylpropionyl-$\beta$-D-arabinofuranosyl)cytosine.

In the same manner as given in Example 50, other $N^4$-acyl - 1 - (2',3'-di-O-acyl-$\beta$-D-arabinofuranosyl)cytosines are obtained by heating the corresponding $N^4$-acyl-1-(2',3'-di-O-acyl-5'-O-triphenylmethyl-$\beta$-D-arabinofuranosyl) cytosine with aqueous acetic acid. Representative compounds thus obtained include: $N^4$-valeryl-1-(2',3'-di-O-valeryl-$\beta$-D-arabinofuranosyl)cytosine, $N^4$-lauroyl-1-(2',3'-di-O-lauroyl-$\beta$-D-arabinofuranosyl)cytosine, $N^4$ - heptanoyl-1-(2',3'-di-O-heptanoyl-$\beta$-D - arabinofuranosyl)cytosine, $N^4$-octanoyl-1-(2',3'-di-O-octanoyl-$\beta$-D-arabinofuranosyl)cytosine, $N^4$-benzoyl-1 - (2',3'-di-O-benzoyl-$\beta$-D-arabinofuranosyl)cytosine, and the like.

*Example 56.—1-(3'-O-propionyl-$\beta$-D-deoxyribofuranosyl)uracil*

In the manner given in Example 50, 1-(3'-O-propionyl-5'-O-triphenylmethyl-$\beta$ - D - deoxyribofuranosyl)uracil is heated with aqueous acetic acid to give 1-(3'-O-propionyl-$\beta$-D-deoxyribofuranosyl)uracil.

*Example 57.—1-(2',3'-di-O-propionyl-$\beta$-D-ribofuranosyl)-5-fluorouracil*

In the manner given in Example 50, 1-(2',3'-di-O-propionyl-5'-O-triphenylmethyl-$\beta$-D-ribofuranosyl)-5-fluorouracil is heated with aqueous acetic acid to give 1-(2',3'-di-O-propionyl-$\beta$-D-ribofuranosyl)-5-fluorouracil.

*Example 58.—9-(3'-O-propionyl-$\beta$-deoxyribofuranosyl)-6-mercaptopurine*

In the manner given in Example 50, 9-(3'-O-propionyl-5'-O-triphenylmethyl-$\beta$-D-deoxyribofuranosyl)-6-mercaptopurine is heated with aqueous acetic acid to give 9-(3'-O-propionyl-$\beta$-D-deoxyribofuranosyl)-6-mercaptopurine.

*Example 59.—1-(3'-O-acetyl-$\beta$-D-deoxyribofuranosyl) uracil*

In the manner given in Example 50, 1-(3'-O-acetyl-5'-O-triphenylmethyl-$\beta$-D-deoxyribofuranosyl)uracil is heated with aqueous acetic acid to give 1-(3'-O-acetyl-$\beta$-D-deoxyribofuranosyl)uracil.

*Example 60.—$N^6$-acetyl-9-(2',3'-di-O-acetyl-$\beta$-D-ribofuranosyl)-7-deazaadenine*

In the manner given in Example 50, $N^6$-acetyl-9-(2',3'-di-O-acetyl-5'-O-triphenylmethyl-$\beta$-D-ribofuranosyl) - 7-deazaadenine is heated with aqueous acetic acid to give $N^6$ acetyl-9-(2',3'-di-O-acetyl-$\beta$-D-ribofuranosyl)-7 - deazaadenine.

Example 61.—1-(3'-O-butyryl-β-D-deoxyribofuranosyl)-5-iodouracil

In the manner given in Example 50, 1-(3'-O-butyryl-5'-O-triphenylmethyl-β-D-deoxyribofuranosyl)-5-iodouracil is heated with aqueous acetic acid to give 1-(3'-O-butyryl-β-D-deoxyribofuranosyl)-5-iodouracil.

In the same manner other ribofuranosides and deoxyribofuranosides of Formula X can be produced, such as 1-(2',3'-di-O-acetyl-β-D-ribofuranosyl)uracil, 1-(2',3'-di-O-acetyl-β-D-ribofuranosyl)-5-fluorouracil, 9 - (2',3'-di-O-acetyl-β-D-ribofuranosyl)-6-mercaptopurine, 1-(3-'-O-benzoyl-β-D-deoxyribofuranosyl)-5-chlorouracil, 1-(3'-O-phenylacetyl-β-D-deoxyribofuranosyl)thymine, and the like.

Example 62.—N⁶-benzoyl-2'-3'-O-isopropylidenetubercidin

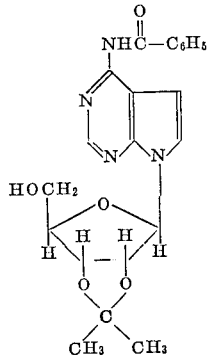

[N⁶-benzoyl-9-(2',3'-O-isopropylidene-β-D-ribofuranosyl)-7-deazaadenine]

(A) *Production of sparsomycin A (tubercidin) by fermentation.*—A soil slant of *Streptomyces sparsogenes* var. *sparsogenes*, NRRL 2940, was used to inoculate a series of 500 ml. Erlenmeyer flasks each containing 100 ml. of seed medium consisting of the following ingredients:

| | |
|---|---|
| Glucose monohydrate | g-- 25 |
| Pharmamedia¹ | g-- 25 |
| Tap water q.s. | l-- 1 |

¹ Pharmamedia is an industrial grade of cottonseed fluor produced by Traders Oil Mill Co., Fort Worth, Tex.

The seed medium presterilization pH was 7.2. The seed was grown for 2 days at 28° C. on a Gump rotary shaker operating at 250 r.p.m.

One shake flask of the seed described above (100 ml.) was used to inoculate a 20 liter seed tank containing 15 l. of the above sterile seed medium (S–1) plus 1 ml./l. of lard oil. The seed tank was grown for 24 hours at a temperature of 28° C., aeration rate of 10 standard l./min., and agitated at a rate of 400 r.p.m.

The seed tank, described above, was then used to inoculate a 380 l. fermentor containing 250 l. of the following sterile medium:

| | |
|---|---|
| Glucose monohydrate | g./l-- 10 |
| Dextrin | g./l-- 15 |
| Pharmamedia | g./l-- 20 |
| Wilson's Peptone Liquor No. 159¹ | g./l-- 5 |
| Lard oil | ml./l-- 2 |
| Tap water | Balance |

¹ Wilson's Peptone Liquor No. 159 is a preparation of hydrolyzed proteins from animal origin.

The fermentation then proceeded for 113 hours during which time the temperature was controlled at 28° C., filtered air supplied at a rate of 100 standard l./minute, and agitation at 28 r.p.m. During the course of the fermentation, 1850 ml. of lard oil was added as an antifoam.

(B) *Recovery of sparsomycin A.*—The whole beer from the above fermentation was adjusted from the harvested pH of 7.1 to pH 2.4 with 350 ml. of sulfuric acid (concentrated) and filtered using 3.6% diatomaceous earth as filter aid. The filter cake was washed with 0.2 volume of deionized water, the clear beer plus wash (vol. 280 l.) was adjusted to pH 7.35 with 300 ml. of 50% aqueous sodium hydroxide and allowed to stand overnight at 10° C. The clear beer was then adjusted to pH 8 with 50 ml. of 50% aqueous sodium hydroxide and stirred for 1 hour with 1% decolorizing carbon and 3% diatomite. The mixture was filtered and the carbon cake washed with 0.2 volume of 20% aqueous acetone. The washed carbon cake was eluted twice with 0.4 volume of 50% aqueous acetone, acidified to pH 2.5 with concentrated sulfuric acid, and the eluates pooled. The pooled acetone eluate (72 l.) was adjusted to pH 6.4 with 30 ml. of 50% aqueous sodium hydroxide and concentrated to an aqueous solution (40 l.). The concentrate was adjusted to pH 5.9 and freeze dried to give 447 g. of lyophilized material.

An additional 1126 g. was obtained by twice repeating the above fermentation and recovery. The combined lyophilized material (1573 g.) was slurried in 10 l. of methanol at 40° C. for 1 hour. Insoluble material was filtered off and washed 3 times with 500 ml. of warm methanol (40° C.). The methanol extracts and washes were combined (11.5 l.) and concentrated in vacuo to a dry preparation weight 321 g. (HRV–25.3) and assaying 125 *Proteus vulgaris* bio units/mg.

(C) *Purification of sparsomycin A Partition Column.*—300 g. of the above preparation (HRV–25.3) was placed in a partition column which was prepared and developed in the following manner. A solvent system was made using equal volumes (350 l.) of McIlvaine's pH 6.0 buffer and methyl ethyl ketone. A slurry containing 9.6 kg. of diatomite in 60 l. of upper phase and 4.8 l. of lower phase of the above-described solvent system was poured into a 12" column and packed with 4 p.s.i.g. of nitrogen. The column feed was dissolved in 3 l. of lower phase, slurried with 1920 g. of diatomite and enough upper phase added to make it mobile. The feed was carefully added to the top of the column bed which was covered with a layer of sea sand. The column was eluted with upper phase solvent at a rate 2 l./minute, 4-l. fractions were collected except at the begining and end of the column when 20-l. fractions were collected. The fractions were concentrated and bio-activities observed on *P. vulgaris* trays. At this point in the process the separation of sparsomycin and sparsomycin A was effectuated. Further processing purified these components and ultimately resulted in crystalline material.

Fractions 24–34, inclusive, from the above partition column contained the sparsomycin (9-β-D-ribofuranosyl-7-deazaadenine) component.

*Purification of sparsomycin A.*—The sparsomycin A component was purified and crystallized in the following manner. Fractions 11–20, inclusive, from the previously described partition column—part C—contained the sparsomycin A component. These fractions were pooled and concentrated under reduced pressure and 7.2 g. of crystalline material was isolated. These crystals were dissolved in 400 ml. of water and 50 ml. of 0.1 N HCl. The solution was heated gently to facilitate dissolving and then filtered. The clear solution was adjusted to pH 9.0 with 50% aqueous sodium hydroxide and chilled in the refrigerator for 5 hours. The crystals were collected by filtration, washed with water, and dried to give 5.65 g. of preparation ADA–102.1. 2 g. of this preparation were then dissolved in 75 ml. of water and 20 ml. of 0.1 N HCl. This clear solution was adjusted to pH 9.0 with 50% aqueous sodium hydroxide. Crystallization started immediately. The solution was left at 25° C. for 7 hours and then the crystals were collected, washed with 25 ml.

of water, and dried to yield 1.52 g. of preparation ADA-105.1 having a melting point of 247.8–250° C., an optical rotation $[\alpha]_D^{25}$ −62° (c.=0.718 in 0.1 N HCl), an equivalent weight of 269, pKa' of 5.07 in water, an ultraviolet absorption spectrum in Water—270 mμ, a=44.14
0.01 N $H_2SO_4$—227 mμ, a=85.28, 271 mμ, a=40.82
0.01 N KOH—270 mμ, a=43.50 a characteristic IR absorption at the following frequencies expressed in reciprocal centimeters

| | |
|---|---|
| 3350 (S) | 1198 (W) |
| 3250 (S) | 1160 (W) |
| 3145 (S) | 1134 (M) |
| 3095 (S) (sh) | 1120 (M) |
| 2880 (S) (oil) | 1093 (M) |
| 2810 (S) (oil) | 1080 (W) |
| 1895 (W) | 1055 (M) |
| 1640 (S) | 1042 (S) |
| 1592 (S) | 1017 (S) |
| 1553 (M) | 992 (S) |
| 1502 (M) | 953 (W) |
| 1475 (M) | 912 (W) |
| 1458 (S) (oil) | 903 (M) |
| 1445 (M) (sh) | 867 (M) |
| 1426 (M) | 852 (W) |
| 1370 (M) (oil) | 842 (W) |
| 1351 (M) | 799 (W) |
| 1306 (M) | 715 (W) |
| 1276 (W) | 704 (S) |
| 1255 (S) | 675 (M) |
| 1241 (M) | 658 (M) | and the following elemental analysis:
*Analysis.*—Calcd. for $C_{11}H_{14}N_4O_4$: C, 49.62; H, 5.30; N, 21.04. Found: C, 49.81; H, 5.20; N, 20.92.

9-β-D-ribofuranosyl-7-deazaadenine (sparsomycin A) was also isolated and purified from fermentation broth in another manner. The fermentation was carried on as described above under A. The whole beer (AJW–63) was adjusted to pH 2.5 with 365 ml. of concentrated sulfuric acid and filtered using 6% diatomaceous earth as filter aid. The filter cake was washed with 0.1 volume of deionized water and the wash added to the clear beer. The clear beer was then adjusted to pH 8.0 with 400 ml. of 50% aqueous sodium hydroxide and stirred 1 hour with 1% decolorizing carbon and 3% diatomite. The mixture was filtered and the carbon cake washed with 0.1 volume of deionized water followed by 0.2 volume of 20% aqueous acetone. The washed carbon was eluted twice with 0.4 volume of 40% aqueous acetone which had been acidified to pH 2.5 with concentrated sulfuric acid, and the eluates were pooled. The pooled acetone eluates were then adjusted to pH 4.8 with 53 ml. of 50% aqueous sodium hydroxide, concentrated to an aqueous solution and freeze-dried to yield 284 g. of preparation WMH–32.6 assaying 9KB μ/mg. in tissue culture. 100 g. of this preparation was then dissolved in 600 ml. of methanol and 4 volumes of ether added to precipitate the inactive material. From the methanol-ether supernatant 2 crops of crystalline material were isolated by allowing the solvent to evaporate slowly. These preparations were pooled and redissolved in 35 ml. of water and 5 ml. of 0.1 N hydrochloric acid. The solution was then filtered and adjusted to pH 9.4 with 50% aqueous sodium hydroxide. The sparsomycin A which separated in crystalline form was collected, washed with water, and dried to give 480 mg. of preparation ADA–104.1 having a melting point of 247.8–250.8° C., an optical rotation $[\alpha]_D^{25}$ −61° (c.=0.908 in 0.1 N HCl), an equivalent weight of 270, pKa' of 5.05 in water, and ultraviolet absorption spectrum in Water—269.5 mμ, a=44.27
0.01 N $H_2SO_4$—227 mμ, a=86.06, 271 mμ, a=41.35
0.01 N KOH—270 mμ, a=43.61 a characteristic IR absorption at the following frequencies expressed in reciprocal centimeters:

| | |
|---|---|
| 3400 (S) | 1280 (M) |
| 3310 (S) | 1260 (S) |
| 3240 (S) | 1245 (S) |
| 3220 (S) | 1200 (M) |
| 3140 (S) | 1164 (M) |
| 2950 (S) (oil) | 1137 (S) |
| 2920 (S) (oil) | 1125 (M) |
| 2850 (S) (oil) | 1092 (S) |
| 2620 (M) | 1084 (M) |
| 1910 (W) | 1057 (M) |
| 1650 (S) | 1045 (S) |
| 1645 (S) | 1020 (S) |
| 1600 (S) | 995 (S) |
| 1526 (S) | 955 (M) |
| 1510 (M) | 912 (M) |
| 1480 (S) | 905 (M) |
| 1462 (S) (oil) | 870 (S) |
| 1425 (S) | 852 (W) |
| 1370 (M) (oil) | 843 (W) |
| 1355 (S) | 800 (M) |
| 1342 (M) | 715 (S) |
| 1310 (M) | 702 (S) |
| 1285 (M) | | and the following elemental analysis:
*Analysis.*—Calcd. for $C_{11}H_{14}N_4O_4$: C, 49.62; H, 5.30; N, 21.04. Found: C, 49.62; H, 5.04; N, 20.81.

The characteristics of sparsomycin A, described above, are in good agreement with those reported in the literature for tubercidin. See Anzai, K.; G. Nakamura and S. Suzuki: A new antibiotic, tubercidin. J. Antibiotics, Ser. A, pp. 201–204, September 1957. However, no process whereby tubercidin can be produced is disclosed.

(D) *9 - (2',3' - O - isopropylidene-β-D-ribofuranosyl)-7-deazaadenine; 2',3'-O-isopropylidenesparsomycin A; 7-(2,3 - O - isopropylidene - β - D - ribofuranosyl) - 7H-pyrrolo[2,3-d]-pyrimidine.*—A mixture of 1 g. of sparsomycin A which has been dried overnight at 108° C. under a reduced pressure of 0.3 mm., 7.5 g. p-toluene-sulfonic acid monohydrate and 50 ml. of acetone which previously had been distilled from potassium permanganate and potassium carbonate in that order, was stirred at room temperature for a period of 2 hours. The reaction mixture was then cooled to 3° C. and a solution of 200 ml. of 0.5 N sodium bicarbonate at 3° C. was added. The resulting solution was evaporated to dryness at 35° C. under reduced pressure. The residue thus obtained was extracted first with two 100-ml. portions of boiling chloroform and then with two 100-ml. portions of chloroform at room temperature. These extracts were filtered individually, then combined and evaporated. The thus-obtained residue was dissolved in 25 ml. of boiling water and the resulting solution was filtered. Refrigeration of the filtrate gave a crystalline precipitate of 2',3'-O-isopropylidenesparsomycin A weighing 0.75 g. (65%) and having a melting point of 170–173° C.

After two additional recrystallizations from water, 9-(2',3' - O - isopropylidene - β - D - ribofuranosyl) - 7 - deazaadenine (2',3'-O-isopropylidenesparsomycin A) (2',3'-isopropylidenetubercidin) of melting point 174–177° C. was obtained having the following analysis:
*Analysis.*—Calcd. for $C_{14}H_{18}N_4O_4$: C, 54.89; H, 5.92; N, 18.19; O, 20.92; $CH_3O$, 4.92. Found: C, 54.72; H, 5.92; N, 18.51; O, 21.2; $CH_3C$, 4.3.

(E) *$N^6,N^6,5'$ - tribenzoyl - 2',3' - O - isopropylidene-tubercidin.*—To a solution of 1.74 g. of 2',3'-O-isopropylidenetubercidin in 50 ml. of pyridine in an ice bath was added 4.35 g. of benzoyl chloride. The reaction mixture was stirred in an ice bath for 90 minutes and then poured into 150 ml. of ice and water. The mixture was then acidified with 2 N hydrochloric acid and filtered. The solid recovered by filtration was recrystallized from acetone-water to yield 3.28 g. of material which was again recrystallized from acetone-water to yield 2.78 g. of analytically pure $N^6,N^6,5'$-tribenzoyl-2',3'-O-isopropylidenetubercidin having a melting point of 131.5–133° C.

*Analysis.*—Calcd. for $C_{35}H_{31}N_4O_7$: C, 67.84; H, 5.04; N, 9.04. Found: C, 67.31; H, 5.04; N, 9.13.

(F) $N^6$ - *benzoyl* - 2',3' - O - *isopropylidenetubercidin*.—To a partial solution of 0.5 g. of $N^6,N^6,5'$-tribenzoyl-2',3'-O-isopropylidenetubercidin in 50 ml. of a mixture of anhydrous tetrahydrofuran and anhydrous methanol (1:1 by volume) in an ice bath was added with stirring 0.2 ml. of 25% sodium methoxide in methanol. The mixture was removed from the ice bath and the reaction followed by thin layer chromatography on silica gel with 50% acetone-50% Skellysolve B hexanes. After 25 minutes at room temperature (about 25° C.) an additional 0.2 ml. of 25% sodium methoxide was added. After 64 minutes most of the starting material had disappeared. The reaction mixture was then cooled overnight (for about 17 hours) in a refrigerator between 0 and 5° C. and was then acidified to a pH between 5–6 with the aid of an acid exchange resin (Dowex 50WX8). The solution was then concentrated under reduced pressure (40–45° C.) to yield a syrup which was chromatographed over 50 g. of silica gel with a mixture consisting of 25% acetone-75% Skellysolve B hexanes, taking fractions of 7 ml. each. Fractions 80–115 were combined and concentrated to give 210 mg. of $N^6$-benzoyl-2',3'-O-isopropylidenetubercidin having the following analysis:

*Analysis.*—Calcd. for $C_{21}H_{22}N_4O_5$: C, 61.30; H, 5.63; N, 13.62. Found: C, 61.05; H, 5.64; N, 13.43.

Recrystallized from ether-Skellysolve B hexanes, $N^6$-benzoyl-2',3'-O-isopropylidenetubercidin had a melting point of 106.5–109° C.

In the same manner shown in Example 62, other nucleosides having Formula IX in which X is hydroxy can be transformed to acetals with acetone, methyl ethyl ketone, diethyl ketone, dipropyl ketone, and the like, to protect positions 2' and 3' from the subsequent phosphorylation. Other groups capable of reacting with phosphorylation reagents can then be protected as shown in Example 62 by forming N-acyl compounds corresponding to Formula XI.

*Example 63.—1-β-D-arabinofuranosylcytosine 5'-phosphate*

To a solution of 40 ml. of pyridine, 0.325 M in 2-cyanoethyl phosphate, was added 2.5 g. of $N^4$-acetyl-1-(2',3' - di - O - acetyl - β - D - arabinofuranosyl)cytosine containing a small amount of 1-(2',3'-di-O-acetyl-β-D-arabinofuranosyl)cytosine. To this solution was added an additional 20 ml. of pyridine containing 5.6 g. of dicyclohexylcarbodiimide. The reaction mixture was shaken in the dark for two days after which time 10 ml. of water was added and the solution warmed to 40° C. The reaction mixture was shaken for 1 hour after which time an additional 75 ml. of water was added and the solution was filtered free of insoluble dicyclohexylurea. The filtrate was taken to dryness, diluted with 50 ml. of water, and again evaporated to remove residual pyridine. The thus-obtained residue was then partitioned between water and ether, 150 ml. (1:1), and the aqueous portion freed of ether in vacuo after a second extraction. The remaining aqueous solution (90 ml.) was then treated with 2.16 g. (90 mmoles) of lithium hydroxide and the solution heated at 100° C. for a period of 1 hour. Thereafter the suspension was chilled and filtered free of lithium phosphate. The solids were washed with 0.01 N lithium hydroxide solution which was added to the filtrate. The filtrate was then adjusted to a pH of 7 by the addition of an exchange resin (Dowex 50X8, H+). The mixture was thereupon filtered and the resin-free solution was distilled to a volume of 25 ml. at 40° C. and under reduced pressure. The solution was then passed through 75 ml. of fresh Dowex 50X8 resin. The resin was eluted with water until the pH of the eluate was in the range of 4–5. The pH of the resulting solution was adjusted to 7.5 by the addition of concentrated ammonium hydroxide. The product-containing solution (about 200 ml.) was absorbed onto a column charged with Dowex AG–1X8 (formate) resin (125 ml.) and the column was eluted with 125 ml. of water. Thereafter, the column was eluted with 0.15 M formic acid solution and the eluate collected in 20-ml. fractions at a flow rate of 2 ml. per minute. After a 200 ml. forerun which was discarded, fractions 13–33 were combined and lyophilized to give a white crystalline solid weighing 250 mg. This material when twice recrystallized from water at 4° C. gave fine needles of 1-β-D-arabinofuranosylcytosine 5'-phosphate having the following analysis:

*Analysis.*—Calcd. for $C_9H_{14}N_3O_8P$: C, 33.44; H, 4.37; N, 13.00; P, 9.58. Found: C, 33.37; H, 4.88; N, 12.61; P, 9.75.

*Example 64.—$N^4$-benzoyl-1-β-D-arabinofuranosylcytosine 5'-phosphate*

A solution was prepared containing 50 mmoles of pyridinium 2-cyanoethyl phosphate and was dissolved in 10 ml. of dry pyridine and thereto was added 2.77 g. of $N^4$ - benzoyl-1-(2',3'-di-O-benzoyl-β-D-arabinofuranosyl)cytosine, whereupon the solution was taken to dryness. The mixture was then dissolved in 25 ml. of pyridine, 3.09 g. (150 mmoles) of dicyclohexylcarbodiimide was added and the mixture was shaken at room temperature for 5½ days. About 15 ml. of water was then added and the mixture extracted twice with Skellysolve B hexanes and filtered free of the insoluble urea compound. The solution was then diluted to 40 ml. with pyridine, chilled to about 0° C. with ice and made about 1 N in sodium hydroxide by the addition of 40 ml. of ice-cold 2 N sodium hydroxide solution. The reaction was terminated after 20 minutes by adding an excess of pyridinium-Dowex 50X8 ion exchange resin. The resin was separated by filtration, washed with water, and the aqueous washing and filtrate were evaporated under reduced pressure to about 25 ml. following the addition of 200 mg. of ammonium bicarbonate. The precipitate in the 25 ml. of solution was removed by filtration. The filtrate was evaporated under reduced pressure and the residue taken up in a solvent system composed of 1 M ammonium acetate (pH 6) and isopropyl alcohol in a 2:5 ratio, then absorbed onto a cellulose column having a column volume of 1850 ml. made up with the same solvent system. The column was then eluted with the molar ammonium acetate-isopropyl alcohol (2:5) mixture. The first 600 ml. of eluate was discarded and then 20-ml. fractions were collected (325 fractions total). Fractions 55–110, when combined, containing approximately 90% of theory of the total amount of $N^4$-benzoyl-1-β-arabinofuranosylcytosine 5'-phosphate, were evaporated to a small volume in the presence of 10 ml. of pyridine, the residue was diluted with water to a volume of 50 ml. and the product absorbed on a column of pyridinium-Dowex 50WX8 ion exchange resin. The column was then eluted with 3 l. of deionized water. The total effluent was concentrated under reduced pressure and rediluted with 1% aqueous pyridine 4 times, followed by concentration. The thus-obtained residue was taken up in dilute aqueous pyridine and lyophilized twice from this solvent to give a white solid in a yield of 1.81 g. (70%) of $N^4$-benzoyl-1-β-D-arabinofuranosylcytosine 5'-phosphate.

*Analysis.*—Calcd. for $C_{16}H_{18}N_3O_9P \cdot H_2O \cdot$ pyridine: P, 5.95. Found: P, 6.06.

Heating this solvate to 100° C. in vacuo (15 mm. Hg) for 72 hours gave $N^4$-benzoyl-1-β-D-arabinofuranosylcytosine 5'-phosphate.

In the same manner given in Examples 63 and 64, other triacyl-β-D-arabinofuranosylcytosines can be phosphorylated, with loss of the acyl groups in positions 2' and 3' and additionally with loss of the acyl group connected to the amino group of the cytosine if the first-obtained cyanophosphate is treated with a strong base at temperatures above 75° C. for prolonged periods.

*Example 65.—1-β-D-arabinofuranosylcytosine 5'-phosphate*

In the manner given in Example 63, $N^4$-(β-cyclopentylpropionyl) - 1-[2',3'-di-O-(β-cyclopentylpropionyl)-β-D-arabinofuranosyl]cytosine was treated with 2-cyanoethyl phosphate, dicyclohexylcarbodiimide, and thereafter with lithium hydroxide at 100° C. to give 1-β-D-arabinofuranosylcytosine 5'-phosphate.

*Example 66.—$N^4$-lauroyl-1-β-D-arabinofuranosylcytosine 5'-phosphate*

In the manner given in Example 64, treating $N^4$-lauroyl-1-(2',3'-di-O-lauroyl-β-arabinofuranosyl)cytosine with 2-cyanoethyl phosphate, then dicyclohexylcarbodiimide, and finally sodium hydroxide at 10° C. gave $N^4$-lauroyl-1-β-D-arabinofuranosylcytosine 5'-phosphate.

Following the procedure of Example 63, $N^4$-decanoyl-1-(2',3' - O-decanoyl-β-D-arabinofuranosyl)cytosine, $N^4$-propionyl-1-(2',3'-di-O-propionyl-β - D - arabinofuranosyl)cytosine, $N^4$ - butyryl-1-(2',3'-di-O-butyryl-β-D-arabinofuranosyl)cytosine, $N^4$-phenylacetyl-1-(2',3'-di-O-phenylacetyl-β-arabinofuranosyl)cytosine, $N^4$ - hexanoyl - 1-(2',3'-di-O-hexanoyl-β-D-arabinofuranosyl)cytosine, and $N^4$-phenylpropionyl - 1-(2',3'-di-O-phenylpropionyl-β-D-arabinofuranosyl)cytosine were converted to the desired 1-β-D-arabinofuranosylcytosine 5'-phosphate.

*Example 67.—$N^4$-benzoyl-1-(2',3'-di-O-acetyl-β-D-arabinofuranosyl)cytosine 5'-phosphate*

A solution of $N^4$-benzoyl-1-β-D-arabinofuranosylcytosine 5'-phosphate was suspended in a mixture of 15 ml. pyridine and 15 ml. of acetic anhydride. This mixture was stirred for about 18 hours at room temperature (about 25° C.). The homogeneous solution was then diluted with 15 ml. of water and stirred for 3 hours at room temperature. The solvent was then removed at 30° C. in a high vacuum and the residue triturated with ether. A gummy material remained which was freed from ether in vacuo, then dissolved in dry pyridine and the solution stored at 4° C. The crystals which separated by this procedure were collected on a filter and represented pure $N^4$-benzoyl-1-(2',3' - di-O-acetyl-β-D-arabinofuranosyl)cytosine 5'-phosphate.

*Example 68.—$N^4$-benzoyl-1-(2',3'-di-O-propionyl-β-D-arabinofuranosyl)cytosine 5'-phosphate*

In the manner given in Example 67, treating $N^4$-benzoyl-1-β-D-arabinofuranosylcytosine 5'-phosphate with propionic anhydride in pyridine gives $N^4$-benzoyl-1-(2',3'-di-O-propionyl-β-D-arabinofuranosyl)cytosine 5'-phosphate.

*Example 69.—$N^4$-benzoyl-1-(2',3'-di-O-butyryl-β-D-arabinofuranosyl)cytosine 5'-phosphate*

In the manner given in Example 67, treating $N^4$-benzoyl-β-D-arabinofuranosylcytosine 5' - phosphate with butyric anhydride in pyridine gives $N^4$-benzoyl-1-(2',3'-di-O-butyryl-β-D-arabinofuranosyl)cytosine 5'-phosphate.

*Example 70.—$N^4$-benzoyl-1-(2',3'-di-O-valeryl-β-D-arabinofuranosyl)cytosine 5'-phosphate*

In the manner given in Example 67, treating $N^4$-benzoyl-1-β-D-arabinofuranosylcytosine 5' - phosphate with valeric anhydride in pyridine gives $N^4$-benzoyl-1-(2',3'-di-O-valeryl-β-D-arabinofuranosyl)cytosine 5'-phosphate.

*Example 71.—$N^4$-benzoyl-1-(2',3'-di-O-benzoyl-β-D-arabinofuranosyl)cytosine 5'-phosphate*

In the manner given in Example 67, treating $N^4$-benzoyl-1-β-D-arabinofuranosylcytosine 5'-phosphate with benzoic anhydride in pyridine gives $N^4$-benzoyl-1-(2',3'-di-O-benzoyl-β-D-arabinofuranosyl)cytosine 5'-phosphate.

*Example 72.—$N^4$-benzoyl-1-(2',3'-di-O-phenylacetyl-β-D-arabinofuranosyl)cytosine 5'-phosphate*

In the manner given in Example 67, treating $N^4$-benzoyl-1 - β - D-arabinofuranosylcytosine 5'-phosphate with phenylacetic anhydride in pyridine gives $N^4$-benzoyl-1-(2', 3'-di-O-phenylacetyl-β-arabinofuranosyl)cytosine 5'-phosphate.

*Example 73.—$N^4$-acetyl-1-(2',3'-di-O-acetyl-β-D-arabinofuranosyl)cytosine 5'-phosphate*

In the manner given in Example 67, 1-β-D-arabinofuranosylcytosine 5'-phosphate was reacted with excess acetic anhydride in pyridine to give $N^4$-acetyl-1-(2',3'-di-O-acetyl-β-D-arbinofuranosyl)cytosine 5'-phosphate.

*Example 74.—$N^4$-propionyl-1-(2,'3'-di-O-propionyl- -D-arabinofuranosyl)cytosine 5'-phosphate*

In the manner given in Example 67, 1-β-D-arabinofuranosylcytosine 5'-phosphate was reacted with excess propionic anhydride in pyridine to give $N^4$-propionyl-1-(2',3'-di-O-propionyl-β-D-arabinofuranosyl)cytosine 5'-phosphate.

*Example 75.—$N^4$-phenylpropionyl - 1-(2',3'-di-O-phenylpropionyl-β-D-arabinofuranosyl)cytosine 5'-phosphate*

In the manner given in Example 67, 1-β-D-arabinofuranosylcytosine 5'-phosphate was reacted with excess phenylpropionic anhydride in pyridine to give $N^4$-phenylpropionyl - 1 - (2',3'-di-O-phenylpropionyl-β-D-arabinofuranosyl)cytosine 5'-phosphate.

*Example 76.—$N^4$-benzoyl - 1 - (2',3'-di-O-benzoyl-β-D-arabinofuranosyl)cytosine 5'-phosphate*

In the manner given in Example 67, 1-β-D-arabinofuranosylcytosine 5'-phosphate was reacted with excess benzoic anhydride in pyridine to give $N^4$-benzoyl-1-(2', 3'-di-O-benzoyl-β-D-arabinofuranosyl)cytosine 5'-phosphate.

*Example 77.—$N^4$ - hexanoyl-1-(2',3'-di-O-hexanoyl-β-D-arabinofuranosyl)cytosine 5'-phosphate*

In the manner given in Example 67, 1-β-D-arabinofuranosylcytosine 5'-phosphate was reacted with excess hexanoic anhydride in pyridine to give $N^4$-hexanoyl-1-(2',3' - di-O-hexanoyl-β-D-arabinofuranosyl)cytosine 5'-phosphate.

*Example 78.—$N^4$-(β-cyclopentylpropionyl)-1-[2',3'-di-O-(β - cyclopentylpropionyl) - β-D-arabinofuranosyl]cytosine 5'-phosphate*

In the manner given in Example 67, 1-β-D-arabinofuranosylcytosine 5'-phosphate was reacted with excess β-cyclopentylpropionyl chloride in pyridine to give $N^4$-(β - cyclopentylpropionyl) - 1-[2',3'-di-O-(β-cyclopentylpropionyl)-β-D-arabinofuranosyl]-cytosine 5'-phosphate.

*Example 79.—$N^4$-lauroyl-1-(2',3'-di-O-lauroyl-β-D-arabinofuranosyl)cytosine 5'-phosphate*

In the manner given in Example 67, 1-β-D-arabinofuranosylcytosine 5'-phosphate was reacted with excess lauroyl chloride in pyridine to give $N^4$-lauroyl-1-(2',3'-di-O-lauroyl-β-D-arabinofuranosyl)cytosine 5'-phosphate.

*Example 80.*—*N⁴ - decanoyl-1-(2',3'-di-O-decanoyl-β-D-arabinofuranosyl)cytosine 5'-phosphate*

In the manner given in Example 67, 1-β-D-arabinofuranosylcytosine 5'-phosphate was reacted with excess decanoyl chloride in pyridine to give N⁴-decanoyl-1-(2',3'-di-O-decanoyl-β-D-arabinofuranosyl)cytosine 5'-phosphate.

lowed to stand at room temperature (24–26° C.) for a period of 20 hours. The solution was then dissolved in 75 ml. of water and extracted with four 50-ml. portions of ether. The water solution was then taken to near dryness with the aid of a rotary evaporator at 34° C. The residue thus obtained was redissolved in 600 ml. of water and lyophilized. The residue was dissolved in 25 ml. of

*Example 81.*—*N⁴-acetyl-1-(2',3'-di-O-acetyl-β-D-arabinofuranosyl)cytosin - 5'-yl N⁴-benzoyl-1-(2',3'-di-O-benzoyl-β-D-ribofuranosyl)cytosin-5'-yl phosphate (XIV) and 1 - β-D - arabinofuranosylcytosin-5'-yl 1-β-D-ribofuranosylcytosin-5'-phosphate (XV)*

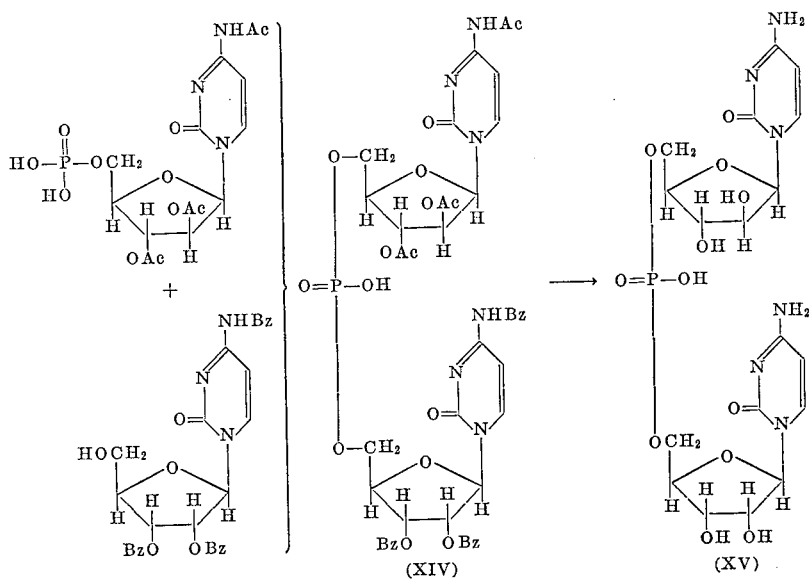

A solution of 1 g. of N⁴-acetyl-1-(2',3'-di-O-acetyl-β-D-arabinofuranosyl)cytosine 5'-phosphate and 1.8 g. of N⁴ - benzoyl-1-(2',3'-di-O-benzoyl-β-D-ribofuranosyl)cytosine and 500 mg. of dry pyridinium-Dowex 50WX8 exchange resin in 25 ml. of pyridine was evaporated at a temperature of 35° C. under reduced pressure six times, employing fresh portions of dry pyridine. After the sixth time, 10 g. of dicyclohexylcarbodiimide was added, dissolved in 25 ml. of dry pyridine. The flask was then stoppered and protected from light with aluminum foil. The flask was shaken for 3 days. At the end of this period 10 ml. of water was added to the solution and the reaction mixture was allowed to stand overnight (about 18 hours). The reaction mixture was then filtered to eliminate the precipitated dicyclohexylurea and the precipitate was washed with two 10-ml. portions of a 1:1 mixture of pyridine and water. The washings were added to the solution and the solution was then extracted 4 times with 50 ml. of Skellysolve B hexanes, the Skellysolve B hexanes extracts were discarded and the aqueous mixture was evaporated at 34° C. in a rotary evaporator to give a residue. To this residue 50 ml. of water was added and the mixture was evaporated to rid the product of pyridine. The dry product was again treated with water and again evaporated and dried with the aid of a water aspirator. The thus-obtained N⁴ - acetyl-1-(2',3'-di-O-acetyl-β - D-arabinofuranosyl)cytosin-5'-yl N⁴-benzoyl-1-(2',3'-di-O-benzoyl-β-D-ribofuranosyl)cytosin-5'-yl phosphate (XIV) was used without any further purification for the production of 1-β-D-arabinofuranosylcytosin-5'-yl 1-β-D-ribofuranosylcytosin-5'-yl phosphate (XV).

For this purpose the ester compound XIV was dissolved in 50 ml. of methanol saturated with ammonia and alwater and extracted with three 25-ml. portions of ether. The ether extracts were discarded and the water fraction lyophilized to give a solid. Thereafter, the solid was lyophilized three times more with 500 ml. of water to eliminate volatile solvents and by-products. The thus-obtained solid was then submitted to continuous flow electrophoresis (using a Model FF continuous-flow, buffer-curtain electrophoresis apparatus manufactured by Brinkman Instruments Company) under conditions as follows: After being dissolved in sufficient 0.5 N acetic acid (pH approximately 2), the electrophoresis was conducted at 10° C. using 90 milliamperes and 2000 volts. Fractions 26–31 which according to thin layer chromatography contained the desired product were combined and again lyophilized to give as a white solid 1-β-D-arabinofuranosylcytosin-5'-yl 1-β-D-ribofuranosylcytosin-5'-yl phosphate (XV).

*Example 82.*—*N⁴ - anisoyl-1-(2',3'-di-O-benzoyl - β - arabinofuranosyl)cytosin-5'-yl 1-(2',3'-di-O-benzoyl-β-D-ribofuranosyl)uracil-5'-yl phosphate and 1-β-D-arabinofuranosylcytosin-5'-yl 1-β-D-ribofuranosyluracil-5'-yl phospate*

In the manner given in Example 81, N⁴-anisoyl-1-(2',3'-di-O-benzoyl-β-D-arabinofuranosyl)cytosine 5'-phosphate in pyridine solution was reacted with 1-(2',3'-di-O-benzoyl-β-D-ribofuranosyl)uracil in the presence of dicyclohexylcarbodiimide to give N⁴-anisoyl-1-(2',3'-di-O-benzoyl-β-D-arabinofuranosyl)cytosin-5'-yl 1-(2',3'-di-O-benzoyl-β-D-ribofuranosyl)uracil-5'-yl phosphate.

The thus-obtained ester product was hydrolyzed as shown in Example 81 with ammoniacal methanol to give 1-β-D-arabinofuranosylcytosin-5'-yl 1-β-D-ribofuranosyluracil-5'-yl phosphate.

*Example 83.*—*N⁴ - anisoyl-1-(2',3'-di-O-benzoyl-β-D-arabinofuranosyl)cytosin-5'-yl 1 - (2',3'-di-O-benzoyl-β-D-ribofuranosyl)thymin-5'-yl- phosphate and 1-β-D-arabinofuranosylcytosin-5'-yl 1-β-D-ribofuranosylthymin-5'-yl phosphate*

In the manner given in Example 81, N⁴-anisoyl-1-(2',3'-di-O-benzoyl-β-D-arabinofuranosyl)cytosine 5'-phosphate in pyridine solution was reacted with 1-(2',3'-di-O-benzoyl-β-D-ribofuranosyl)thymine in the presence of dicyclohexylcarbodiimide to give N⁴-anisoyl-1-(2',3'-di-O-benzoyl-β-D-arabinofuranosyl)cytosin-5'-yl 1-(2',3'-di-O-benzoyl-β-D-ribofuranosyl)thymin-5'-yl phosphate.

The thus-obtained ester product was hydrolyzed as shown in Example 81 with ammoniacal methanol to give 1-β-D-arabinofuranosylcytosin-5'-yl 1-β-D-ribofuranosylthymin-5'-yl phosphate.

*Example 84.*—*N⁴ - anisoyl - 1 - (2',3' - di-O-benzoyl-β-D-arabinofuranosyl)cytosin-5'-yl 1-(2',3'-di-O-benzoyl-β-D-ribofuranosyl) - 5 - fluorouracil-5'-yl phosphate and 1-β-D-arabinofuranosylcytosin-5'-yl 1-β-D-ribofuranosyl-5-fluorouracil-5'-yl phosphate*

In the manner given in Example 81, N⁴-anisoyl-1-(2',3'-di-O-benzoyl-β-D-arabinofuranosyl)cytosine 5'-phosphate in pyridine solution was reacted with 1-(2',3'-di-O-benzoyl-β-D-ribofuranosyl)-5-fluorouracil in the presence of dicyclohexylcarbodiimide to give N⁴-anisoyl-1-(2',3'-di-O-benzoyl-β-D-arabinofuranosyl)cytosin-5'-yl 1-(2',3'-di-O - benzoyl-β-D-ribofuranosyl)-5-fluorouracil-5'-yl phosphate.

The thus-obtained ester product was hydrolyzed as shown in Example 81 with ammoniacal methanol to give 1-β-D-arabinofuranosylcytosine-5'-yl 1-β-D-ribofuranosyl-5-fluorouracil-5'-yl phosphate.

*Example 85.*—*N⁴-anisoyl-1-(2',3'-di-O-benzoyl-β-D-arabinofuranosyl)cytosin - 5' - yl N⁶ - benzoyl-9-(2',3'-di-O-benzoyl-β-D-ribofuranosyl)-7-deazaadenin-5'-yl phosphate and 1-β-D-arabinofuranosylcytosin-5'-yl 9-β-D-ribofuranosyl-7-deazaadenin-5'-yl phosphate*

In the manner given in Example 81, N⁴-anisoyl-1-(2',3'-di-O-benzoyl-β-D-arabinofuranosyl)cytosine 5'-phosphate in pyridine solution was reacted with N⁶-benzoyl-9-(2',3'-di-O-benzoyl-β-D-ribofuranosyl)-7-deazaadenine in the presence of dicyclohexylcarbodiimide to give N⁴-anisoyl-1 - (2',3'-di-O-benzoyl-β-D-arabinofuranosyl)cytosin-5'-yl N⁶-benzoyl - 9 - (2',3'-di-O-benzoyl-β-D-ribofuranosyl)-7-deazaadenin-5'-yl phosphate.

The thus-obtained ester product was hydrolyzed as shown in Example 81 with ammoniacal methanol to give 1-β-D-arabinofuranosylcytosin-5'-yl 9-β-D-ribofuranosyl-7-deazaadenin-5'-yl phosphate.

*Example 86.*—*N⁴-anisoyl-1-(2',3'-di-O-benzoyl-β-D-arabinofuranosyl)cytosin - 5' - yl 9-(2',3'-di-O-benzoyl-β-D-ribofuranosyl) - 6 - mercaptopurin-5'-yl phosphate and 1-β-D-arabinofuranosylcytosin-5'-yl 9-β-D-ribofuranosyl-6-mercaptopurin-5'-yl phosphate*

In the manner given in Example 81, N⁴-anisoyl-1-(2',3' - di - O - benzoyl - β - D - arabinofuranosyl)cytosine 5'-phosphate in pyridine solution was reacted with 9-(2',3' - di - O - benzoyl-β-D-ribofuranosyl)-6-mercaptopurine in the presence of dicyclohexylcarbodiimide to give N⁴-anisoyl-1-(2',3'-di-O-benzoyl-β-D-arabinofuranosyl)cytosin-5'-yl 9-(2',3'-di-O-benzoyl-β-D-ribofuranosyl)-6-mercaptopurin-5'-yl phosphate.

The thus-obtained ester product was hydrolyzed as shown in Example 81 with ammoniacal methanol to give 1-β-D-arabinofuranosylcytosin-5'-yl 9-β-D-ribofuranosyl-6-mercaptopurin-5'-yl phosphate.

*Example 87.*—*N⁴-anisoyl-1-(2',3'-di-O-benzoyl-β-D-arabinofuranosyl)cytosin-5'-yl 1-(3'-O-benzoyl-β-D-deoxyribofuranosyl)uracil-5'-yl phosphate and 1-β-D-arabinofuranosylcytosin - 5' - yl 1-β-D-deoxyribofuranosyluracil-5'-yl phosphate*

In the manner given in Example 81, N⁴-anisoyl-1-(2',3'-di-O-benzoyl-β-D-arabinofuranosyl)cytosine 5'-phosphate in pyridine solution was reacted with 1-(3'-O-benzoyl-β-D-deoxyribofuranosyl)uracil in the presence of dicyclohexylcarbodiimide to give N⁴-anisoyl-1-(2',3'-di-O-benzoyl-β-D-arabinofuranosyl)cytosin - 5' - yl 1-(3'-O-benzoyl-β-D-deoxyribofuranosyl)uracil-5'-yl phosphate.

The thus-obtained ester product was hydrolyzed as shown in Example 81 with ammoniacal methanol to give 1 - β - D - arabinofuranosylcytosin-5'-yl 1-β-D-deoxyribofuranosyluracil-5'-yl phosphate.

*Example 88.*—*N⁴-anisoyl-1-(2',3'-di-O-benzoyl-β-D-arabinofuranosyl)cytosin-5'-yl N⁴-benzoyl-1-(3'-O-benzoyl-β-D-deoxyribofuranosyl)cytosin - 5' - yl phosphate and 1-β-D-arabinofuranosylcytosin-5'-yl 1-β-D-deoxyribofuranosylcytosin-5'-yl phosphate*

In the manner given in Example 81, N⁴-anisoyl-1-(2',3'-di-O-benzoyl-β-D-aribonofuranosyl)cytosine 5'-phosphate in pyridine solution was reacted with N⁴-benzoyl-1-(3'-O-benzoyl-β-D-deoxyribofuranosyl)cytosine in the presence of dicyclohexylcarbodiimide to give N⁴-anisoyl-1-(2',3'-di-O-benzoyl-β-D-arabinofuranosyl)cytosin-5'-yl N⁴-benzoyl-1-(3'-O-benzoyl - β - D - deoxyribofuranosyl)cytosin-5'-yl phosphate.

The thus-obtained ester product was hydrolyzed as shown in Example 81 with ammoniacal methanol to give 1-β-D-arabinofuranosylcytosin - 5' - yl 1-β-D-deoxyribofuranosylcytosin-5'-yl phosphate.

*Example 89.*—*N⁴-anisoyl-1-(2',3'-di-O-benzoyl-β-D-arabinofuranosyl)cytosin-5'-yl 1 - (3'-O-benzoyl-β-D-deoxyribofuranosyl)thymin-5'-yl phosphate and 1-β-D-arabinofuranosylcytosin-5'-yl 1 - β - D - deoxyribofuranosylthymin-5'-yl phosphate*

In the manner given in Example 81, N⁴-anisoyl-1-(2',3'-di-O-benzoyl-β-D-arabinofuranosyl)cytosine 5'-phosphate in pyridine solution was reacted with 1-(3'-O-benzoyl-β-D-deoxyribofuranosyl)thymine in the presence of dicyclohexylcarbodiimide to give N⁴-anisoyl-1-(2',3'-di-O-benzoyl-β-D-arabinofuranosyl)cytosin-5'-yl 1-(3'-O-benzoyl-β-D-deoxyribofuranosyl)thymin-5'-yl phosphate.

The thus-obtained ester product was hydrolyzed as shown in Example 81 with ammoniacal methanol to give 1-β-D-arabinofuranosylcytosin - 5' - yl 1-β-D-deoxyribofuranosylthymin-5'-yl phosphate.

*Example 90.*—*N⁴-anisoyl-1-(2',3'-di-O-benzoyl-β-D-arabinofuranosyl)cytosin-5'yl 1 - (3'-O-benzoyl-β-D-deoxyribofuranosyl)-5-fluorouracil-5'-yl phosphate and 1-β-D-arabinofuranosylcytosin-5'-yl 1-β-D-deoxyribofuranosyl-5-fluorouracil-5'-yl phosphate*

In the manner given in Example 81, N⁴-anisoyl-1-(2',3'-di-O-benzoyl-β-D-arabinofuranosyl)cytosine 5'-phosphate in pyridine solution was reacted with 1-(3'-O-benzoyl-β-D-deoxyribofuranosyl)-5-fluorouracil in the presence of dicyclohexylcarbodiimide to give N⁴-anisoyl-1-(2',3'-di-O-benzoyl-β-D-arabinofuranosyl)cytosin - 5' - yl 1-(3'-O-benzoyl - β - D - deoxyribofuranosyl) - 5 - fluorouracil-5'-yl phosphate.

The thus-obtained ester product was hydrolyzed as shown in Example 81 with ammoniacal methanol to give 1-β-D-arabinofuranosylcytosin - 5' - yl 1-β-D-deoxyribofuranosyl-5-fluorouracil-5'-yl phosphate.

*Example 91.*—*N⁴ - anisoyl - 1 - (2', 3' - di - O - benzoyl-β - D - arabinofuranosyl)cytosin - 5' - yl N⁶ - benzoyl-9 - (3' - O - benzoyl - β - D - deoxyribofuranosyl) - 7-deazaadenin - 5' - yl phosphate and 1 - β - D - arabinofuranosylcytosin - 5' - yl 9 - β - D - deoxyribofuranosyl - 7 - deazaadenin - 5' - yl phosphate*

In the manner given in Example 81, N⁴-anisoyl-1-(2',3' - di - O - benzoyl - β - D - arabinofuranosyl)cytosine 5'-phosphate in pyridine solution was reacted with N⁶-benzoyl - 9 - (3' - O - benzoyl - β - D - deoxyribofuranosyl)-7-deazaadenine in the presence of dicyclohexylcarbodiimide to give N⁴-anisoyl-1-(2',3'-di-O-benzoyl-β - D - arabinofuranosyl)cytosin - 5' - yl N⁶-benzoyl-9-(3' - O - benzoyl - β - D - deoxyribofuranosyl) - 7 - deazaadenin-5'-yl phosphate.

The thus-obtained ester product was hydrolyzed as shown in Example 81 with ammoniacal methanol to give 1 - β - D - arabinofuranosylcytosin - 5' - yl 9-β-D-deoxyribofuranosyl-7-deazaadenin-5'-yl phosphate.

*Example 92.*—*N⁴ - anisoyl - 1 - (2',3' - di - O - benzoyl-β - D - arabinofuranosyl)cytosin - 5' - yl 9 - (3' - O-benzoyl - β - D - deoxyribofuranosyl) - 6 - mercaptopurin-5'-yl phosphate and 1-β-D-arabinofuranosylcytosin - 5' - yl 9 - β - D - deoxyribofuranosyl - 6 - mercaptopurin-5'-yl phosphate*

In the manner given in Example 81, N⁴-anisoyl-1-(2', 3' - di - O - benzoyl - β - D - arabinofuranosyl) cytosine 5'-phosphate in pyridine solution was reacted with 9-(3'-O-benzoyl-β-D-deoxyribofuranosyl)-6-mercaptopurine in the presence of dicyclohexylcarbodiimide to give N⁴-anisoyl - 1 - (2',3' - di - O - benzoyl - β - D - arabinofuranosyl)cytosin - 5' - yl 9 - (3' - O - benzoyl - β - D - deoxyribofuranosyl)-6-mercaptopurin-5'-yl phosphate.

The thus-obtained ester product was hydrolyzed as shown in Example 81 with ammoniacal methanol to give 1 - β - D - arabinofuranosylcytosin - 5' - yl 9 - β - D-deoxyribofuranosyl-6-mercaptopurin-5'-yl phosphate.

*Example 93.*—*N⁴ - acetyl - 1 - (2',3' - di - O - acetyl - β-D - arabinofuranosyl) - cytosin - 5' - yl 1 - (2',3' - di-O - benzoyl - β - D - ribofuranosyl)uracil - 5' - yl phosphate and 1-β-D-arabinofuranosylcytosin-5'yl 1-β-D-ribofuranosyluracil-5'-yl phosphate*

In the manner given in Example 81, N⁴-acetyl-1-(2',3'-di - O - acetyl - β - D - arabinofuranosyl)cytosine 5'-phosphate in pyridine solution was reacted with 1-(2', 3'-di-O-benzoyl-β-D-ribofuranosyl)uracil in the presence of dicyclohexylcarbodiimide to give N⁴-acetyl-1-(2',3'-di - O - acetyl - β - D - arabinofuranosyl)cytosin - 5' - yl 1 - (2',3' - di - O - benzoyl - β - D - ribofuranosyl)uracil-5'-yl phosphate.

The thus-obtained ester product was hydrolyzed as shown in Example 81 with ammoniacal methanol to give 1 - β - D - arabinofuranosylcytosin - 5' - yl 1 - β - D-ribofuranosyluracil-5'-yl phosphate, identical with the end product of Example 82.

*Example 94.*—*N⁴ - anisoyl - 1 - (2',3' - di - O - benzoyl-β - D - arabinofuranosyl)cytosin - 5' - yl N⁶ - benzoyl-9 - (2',3' - O - isopropylidene - β - D - ribofuranosyl)-7-deazaadenin-5'-yl phosphate and 1-β-D-arabinofuranosylcytosin - 5' - yl 9 - β - D - ribofuranosyl - 7 - deazaadenin-5'-yl phosphate*

In the manner given in Example 81, N⁴-anisoyl-1-(2', 3' - di - O - benzoyl - β - D - arabinofuranosyl)cytosine 5'-phosphate in pyridine solution was reacted with N⁶ - benzoyl - 9 - (2',3' - di - O - isopropylidene - β - D-ribofuranosyl)-7-deazaadenine during a period of 5 days at 24–26° C., in the presence of dicyclohexylcarbodiimide to give N⁴-anisoyl 1-(2',3'-di-O-benzoyl-β-D-arabinofuranosyl)cytosin - 5' - yl N⁶ - benzoyl - 9 - (2',3'-O - isopropylidene - β - D - ribofuranosyl) - 7 - deazaadenin-5'-yl phosphate.

The thus-obtained ester product was first hydrolyzed as shown in Example 81 with ammoniacal methanol and the thus-obtained product was hydrolyzed with a methanol solution containing 5% of hydrogen chloride to give 1 - β - D - arabinofuranosylcytosin - 5' - yl 9-β-D-ribofuranosyl-7-deazaadenin-5'-yl phosphate, identical with the product of Example 85.

*Example 95.*—*N⁴ - benzoyl - 1 - (2',3' - di - O - acetyl-β - D - arabinofuranosyl)cytosin - 5' - yl 9 - (2',3'-O - isopropylidene - β - D - ribofuranosyl)hypoxanthin-5' - yl phosphate and 1-β-D-arabinofuranosylcytosin-5'-yl 9-β-D-ribofuranosylhypoxanthin-5'-yl phosphate*

In the manner given in Example 81, N⁴-benzoyl-1-(2', 3' - di - O - acetyl - β - D - arabinofuranosyl)cytosine 5'-phosphate in pyridine solution was reacted with 9-(2', 3' - di - O - isopropylidene - β - D - ribofuranosyl)hypoxanthine in the presence of dicyclohexylcarbodiimide to give N⁴ - benzoyl - 1 - (2',3' - di - O - acetyl - β - D-arabinofuranosyl)cytosin - 5' - yl 9 - (2',3' - O - isopropylidene-β-D-ribofuranosyl)hypoxanthin-5'-yl phosphate.

The thus-obtained ester product was hydrolyzed as shown in Example 94 with ammoniacal methanol and then methanol containing hydrogen chloride to give 1 - β - D - arabinofuranosylcytosin - 5' - yl 9 - β - D-ribofuranosylhypoxanthin-5'-yl phosphate.

In the manner illustrated by prior Examples 81–95, inclusive, other 5',5'-dinucleoside phosphate esters of Formula VIII containing as one nucleoside moiety 1-β-D-arabinofuranosylcytosine and the other a β-D-ribofuranoside or β-D-deoxyribofuranoside can be prepared. Such representative nucleosides of this type include:

1-β-D-arabinofuranosylcytosin-5'-yl 9-β-D-ribofuranosyladenin-5'-yl phosphate,
1-β-D-arabinofuranosylcytosin-5'-yl 9-β-D-ribofuranosylguanin-5'-yl phosphate,
1-β-D-arabinofuranosylcytosin-5'-yl 1-β-D-ribofuranosyl-5-iodouracil-5'-yl phosphate,
1-β-D-arabinofuranosylcytosin-5'-yl 1-β-D-ribofuranosyl-5-bromouracil-5'-yl phosphate,
1-β-D-arabinofuranosylcytosin-5'-yl 1-β-D-ribofuranosyl-5-trifluoromethyluracil-5'-yl phosphate,
1-β-D-arabinofuranosylcytosin-5'-yl 1-β-D-deoxyribofuranosyl-5-iodouracil-5'-yl phosphate,
1-β-D-arabinofuranosylcytosin-5'-yl 1-β-D-deoxyribofuranosyl-5-bromouracil-5'-yl phosphate,
1-β-D-arabinofuranosylcytosin-5'-yl 1-β-D-deoxyribofuranosyl-5-chlorouracil-5'-yl phosphate,
1-β-D-arabinofuranosylcytosin-5'-yl 9-β-D-deoxyribofuranosylxanthin-5'-yl phosphate,
1-β-D-arabinofuranosylcytosin-5'-yl 9-β-D-deoxyribofuranosyladenin-5'-yl phosphate, and the like.

I claim:
1. A 5',5'-dinucleoside phosphate of the formula:

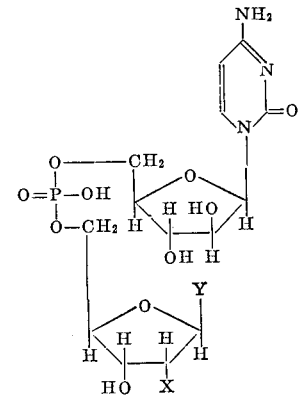

wherein X is selected from the group consisting of hydrogen and hydroxy, and wherein Y is selected from the group consisting of cytosin-1-yl, uracil-1-yl, thymin-1-yl, adenin-9-yl, guanin-9-yl, 7-deazaadenin-9-yl, 6-mercaptopurin-9-yl, uracil-3-yl, 5-fluorouracil-1-yl, 5-chlorouracil-1-yl, 5-bromouracil-1-yl, 5-iodouracil-1-yl, 5-trifluoromethyluracil-1-yl, hypoxanthin-9-yl, xanthin-9-yl, and 5-methylcytosin-1-yl.

2. 1-$\beta$-D-arabinofuranosylcytosin-5'-yl, 1-$\beta$-D-ribofuranosylcytosin-5'-yl phosphate of the formula:

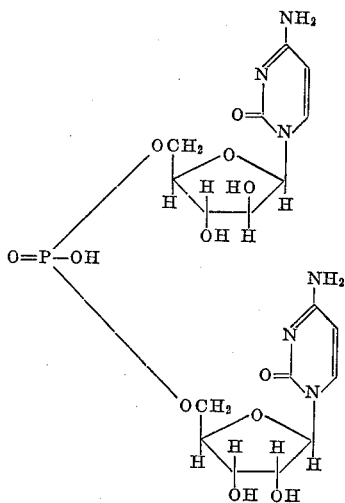

3. 1-$\beta$-D-arabinofuranosylcytosin-5'-yl 1-$\beta$-D-ribofuranosyl-uracil-5'-yl phosphate.

4. 1-$\beta$-D-arabinofuranosylcytosin-5'yl 1-$\beta$-D-deoxyribofuranosylcytosin-5'-yl phosphate.

5. 1-$\beta$-D-arabinofuranosylcytosin-5ɪ-yl 1-$\beta$-D-deoxyribofuranosyluracil-5'-yl phosphate.

6. 1-$\beta$-D-arabinofuranosylcytosin-5'-yl 9-$\beta$ - D - ribofuranosyl-7-deazaadenin-5'-yl phosphate.

7. 1-$\beta$-D-arabinofuranosylcytosin - 5'-yl 9-$\beta$-D-ribofuranosyl-adenin-5'-yl phosphate.

8. 1-$\beta$-D-arabinofuranosylcytosin-5'-yl 1-$\beta$ - D - deoxyribofuranosylthymin-5'-yl phosphate.

9. A compound of the formula:

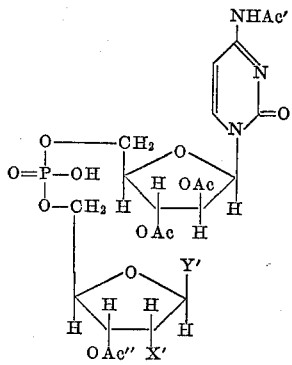

wherein Ac, Ac' and Ac" are acyl radicals of hydrocarbon carboxylic acids containing from 2 to 12 carbon atoms, inclusive, wherein X' is selected from the group consisting of hydrogen and OAc" in which Ac" is defined as above, and wherein Y' is selected from the group consisting of cytosin-1-yl, uracil-1-yl, thymin-1-yl, adenin-9-yl, guanin-9-yl, 7-deazaadenin-9-yl, 6-mercaptopurin-9-yl, uracil-3-yl, 5-fluorouracil-1-yl, 5-chlorouracil-1-yl, 5-bromouracil-1-yl, 5-iodouracil - 1-yl, 5-trifluoromethyluracil-1-yl, hypoxanthin-9-yl, xanthin-9-yl, and 5-methylcytosin-1-yl, in which amino groups are protected by an acyl group defined as hereinabove.

10. N$^4$-acetyl-1-(2',3'-di - O - acetyl-$\beta$-D-arabinofuranosyl)cytosin-5'-yl N$^4$-benzoyl - 1 - (2',3'-di - O - benzoyl-$\beta$-D-ribofuranosyl)cytosin-5'-yl phosphate.

11. A compound of the formula:

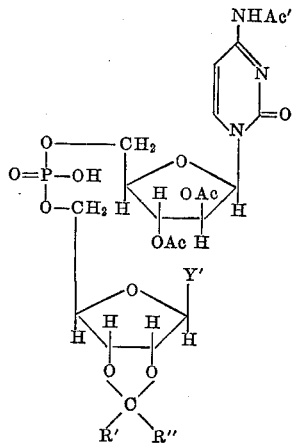

wherein R' and R" are lower alkyl having from 1 to 3 carbon atoms, inclusive, wherein Ac and Ac' are acyl radicals of hydrocarbon carboxylic acids having from 2 to 12 carbon atoms, inclusive, and wherein Y' is selected from the group consisting of cytosin-1-yl, uracil-1-yl, thymin-1-yl, adenin-9-yl, guanin-9-yl, 7-deazaadenin-9-yl, 6-mercaptopurin-9-yl, uracil-3-yl, 5-fluorouracil-1-yl, 5-chlorouracil-1-yl, 5-bromouracil-1-yl, 5-iodouracil-1-yl, 5-trifluoromethyluracil-1-yl, hypoxanthin-9-yl, xanthin-9-yl, and 5-methylcytosin-1-yl, in which amino groups are protected by an acyl group, defined as hereinabove.

12. N$^4$-anisoyl-1-(2',3'-di-O-benzoyl - $\beta$ - D-arabinofuranosyl)cytosin-5'-yl N$^6$-benzoyl-9-(2',3'-di-O-isopropylidene-$\beta$-D-ribofuranosyl)-7-deazaadenin-5'-yl phosphate.

13. A process for the production of an oligonucleotide of the Formula VIII:

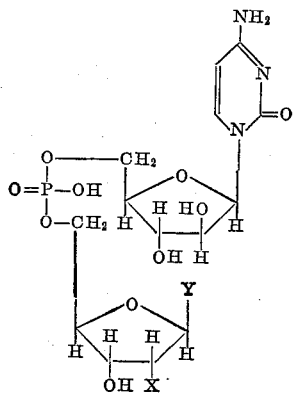

(VIII)

wherein X is selected from the group consisting of hydrogen and hydroxy, and wherein Y is selected from the group consisting of cytosin-1-yl, uracil-1-yl, thymin-1-yl, adenin-9-yl, guanin-9-yl, 7-deazaadenin-9-yl, 6-mercaptopurin-9-yl, uracil-3-yl, 5-fluorouracil-1-yl, 5-chlorouracil-1-yl, 5-bromouracil-1-yl, 5-iodouracil-1-yl, 5-trifluoromethyluracil-1-yl, hypoxanthin-9-yl, xanthin-9-yl, and 5-methylcytosin-1-yl, which comprises the steps: (1) treating 1-$\beta$-D-arabinofuranosylcytosine with an etherifying agent selected from the group of chlorides and bromdies of triphenylmethyl, (p-methoxyphenyl)diphenylmethyl and bis(p-methoxyphenyl)phenylmethyl to obtain the corresponding 1-(5'-O-triphenylmethyl - $\beta$ - D-arabinofuranosyl)cytosine; (2) acylating this ether with an acylating agent selected from acid anhydrides and acid halides of hydrocarbon carboxylic acids containing from 2 to 12 carbon atoms, inclusive, to obtain the corresponding N$^4$-acyl-1-(2',3'-di-O-acyl-5'-O-triphenylmethyl-$\beta$-D- arabinofuranosyl)cytosine; (3) cleaving the ether group by treating the ether triacyl compound with hydrogen halide to obtain the corresponding N⁴-acyl-1-(2',3'-di-O-acyl-β-D-arabinofuranosyl)cytosine; (4) treating the triacyl compound with a phosphorylating agent in the presence of a condensing agent and then with an alkali base to obtain a 1-β-D-arabinofuranosylcytosine 5'-phosphate; (5) reacylating the thus-obtained 5'-phosphate with an acylating agent selected from acid anhydrides and acid halides of hydrocarbon carboxylic acids defined as above, to obtain the corresponding N⁴-acyl-1-(2',3'-di-O-acyl-β-D-arabinofuranosyl)cytosine 5'-phosphate; (6) reacting this phosphate with a compound of the formula below:

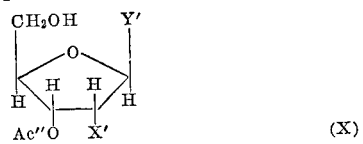

wherein Ac'' is an acyl group of a hydrocarbon carboxyl acid containing from 2 ot 12 carbon atoms, inclusive, wherein X' is selected from hydrogen and OAc'' in which Ac'' is an acyl group as hereinabove, and wherein Y' is defined as Y in which amino groups are protected by an acyl group, defined as hereinabove, to give a compound of the Formula VII:

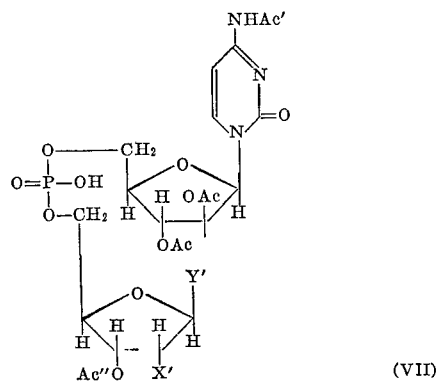

wherein Ac, Ac' and Ac'' are acyl groups, defined as above, X' and Y' are defined as hereinabove; and (7) hydrolyzing this polyacyl compound to obtain the compound of Formula VIII.

14. A process for the production of an oligonucleotide of the Formula VIII:

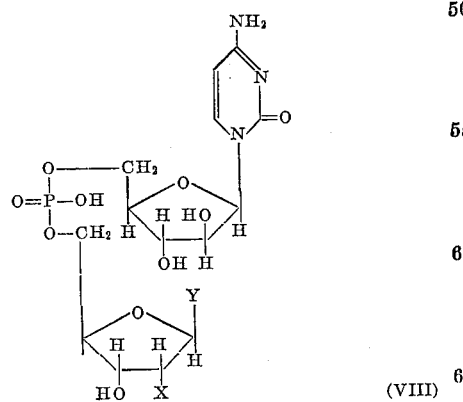

wherein X is hydroxy, and wherein Y is selected from the group consisting of cytosin-1-yl, uracil-1-yl, thymin-1-yl, adenin-9-yl, guanin-9-yl, 7-deazaadenin-9-yl, 6-mercaptopurin-9-yl, uracil-3-yl, 5-fluorouracil-1-yl, 5-chlorouracil-1-yl, 5-bromo-uracil-1-yl, 5-iodouracil-1-yl, 5-trifluoromethyluracil-1-yl, hypoxanthin-9-yl, xanthin-9-yl, and 5-methylcytosin-1-yl, which comprises the steps: (1) treating 1-β-D-arabinofuranosylcytosine with an etherifying agent selected from the group of chlorides and bromides of triphenylmethyl, (p-methoxyphenyl)-diphenylmethyl, (p-methoxyphenyl)phenylmethyl to obtain the corresponding 1-(5'-O-triphenylmethyl-β-D-arabinofuranosyl)-cytosine; (2) acylating this ether with an acylating agent selected from acid anhydrides and acid halides of hydrocarbon carboxylic acid containing from 2 to 12 carbon atoms, inclusive, to obtain the corresponding N⁴-acyl - 1 - (2',3'-di-O-acyl-5'-O-triphenylmethyl-β-D-arabinofuranosyl)cytosine; (3) cleaving the ether group by treating the ether triacyl compound with hydrogen halide to obtain the corresponding N⁴-acyl-1-(2',3'-di-O-acyl-β-D-arabinofuranosyl)cytosine; (4) treating the triacyl compound with a phosphorylating agent in the presence of a condensing agent and then with an alkali base to obtain a 1-β-D-arabinofuranosylcytosine 5'-phosphate; (5) reacylating the thus-obtained 5'-phosphate with an acylating agent selected from acid anhydrides and acid halides of hydrocarbon carboxylic acids defined as above, to obtain the corresponding N⁴-acyl-1-(2',3'-di-O-acyl-β-D-arabinofuranosyl)cytosine 5'-phosphate; (6) reacting this phosphate with a compound of the formula below:

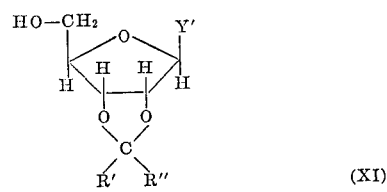

wherein R' and R'' are lower alkyl having from 1 to 3 carbon atoms, inclusive, and wherein Y' is defined as Y in which amino groups are protected by an acyl group of a hydrocarbon carboxylic acid containing from 2 to 12 carbon atoms, inclusive, to give a compound of the formula:

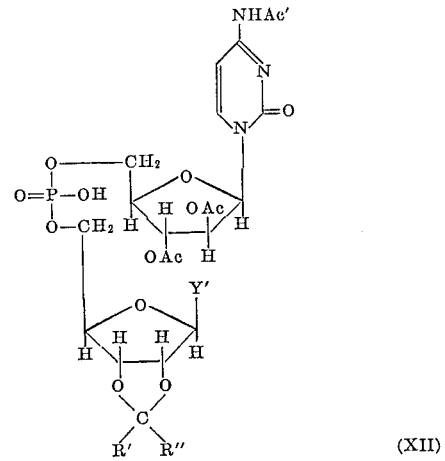

wherein Ac and Ac' are acyl groups of hydrocarbon carboxylic acids containing from 2 to 12 carbon atoms, inclusive, R', R'' and Y' are defined as hereinabove; and (7) hydrolyzing this polyacyl compound with a base and thereupon with a mineral acid to obtain the compound of Formula VIII.

References Cited by the Examiner

UNITED STATES PATENTS 2,970,139    1/1961    Duschinsky et al.    260—211.5
3,116,282    12/1963    Hunter    260—211.5
3,208,997    9/1965    Iwai et al.    260—211.5

LEWIS GOTTS, *Primary Examiner.*

JOHNNIE R. BROWN, *Assistant Examiner.*